United States Patent
Tanaka et al.

(10) Patent No.: US 12,494,620 B2
(45) Date of Patent: Dec. 9, 2025

(54) WAVELENGTH-TUNABLE LASER DEVICE AND WAVELENGTH CONTROL METHOD

(71) Applicant: FURUKAWA ELECTRIC CO., LTD., Tokyo (JP)

(72) Inventors: Masanaga Tanaka, Tokyo (JP); Masayoshi Kimura, Tokyo (JP); Akihisa Kondo, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 810 days.

(21) Appl. No.: 17/444,857

(22) Filed: Aug. 11, 2021

(65) Prior Publication Data

US 2021/0376569 A1    Dec. 2, 2021

Related U.S. Application Data

(63) Continuation of application No. PCT/JP2020/005467, filed on Feb. 13, 2020.

(30) Foreign Application Priority Data

Feb. 14, 2019  (JP) .................................. 2019-024919

(51) Int. Cl.
  *H01S 5/14*    (2006.01)
  *H01S 5/00*    (2006.01)
  (Continued)

(52) U.S. Cl.
  CPC .............. *H01S 5/141* (2013.01); *H01S 5/005* (2013.01); *H01S 5/1007* (2013.01); *H01S 5/142* (2013.01); *H01S 5/50* (2013.01)

(58) Field of Classification Search
  CPC ....... H01S 5/142; H01S 5/0687; H01S 5/0617
  See application file for complete search history.

(56) References Cited

U.S. PATENT DOCUMENTS

| 8,743,920 B2 | 6/2014 | Koshi et al. |
| 10,193,305 B2 | 1/2019 | Kawakita et al. |

(Continued)

FOREIGN PATENT DOCUMENTS

| CN | 101847825 A | 9/2010 |
| CN | 101971445 A | 2/2011 |

(Continued)

OTHER PUBLICATIONS

International Search Report issued Apr. 21, 2020 in PCT/JP2020/005467 filed on Feb. 13, 2020, 2 pages.

*Primary Examiner* — Minsun O Harvey
*Assistant Examiner* — Fernanda Adriana Camacho Alanis
(74) *Attorney, Agent, or Firm* — Oblon, McClelland, Maier & Neustadt, L.L.P.

(57) ABSTRACT

A wavelength-tunable laser device includes: a wavelength-tunable light source part; an optical filter; a light receiving element; and a control device. Further, the control device includes: a monitor value calculating part configured to calculate a monitor value; a storage part configured to store wavelength control information; a target value calculating part configured to calculate a control target value; and a wavelength control part configured to control the wavelength of the laser beam to be the target wavelength, and the wavelength control information is information in which a wavelength, a control reference value, and mode identification information are associated with each other, and the target value calculating part calculates the control target value based on the wavelength control information stored in association with the same mode identification information when the same wavelength as the target wavelength is different from the wavelength control information stored in the storage part.

7 Claims, 11 Drawing Sheets

(51) Int. Cl.
    *H01S 5/10*      (2021.01)
    *H01S 5/50*      (2006.01)

(56) References Cited

U.S. PATENT DOCUMENTS

| | | | |
|---|---|---|---|
| 10,270,533 B2* | 4/2019 | Nishita | ................ H04B 10/506 |
| 2002/0126345 A1* | 9/2002 | Green | ................ G02B 6/29361 |
| | | | 398/82 |
| 2010/0246614 A1 | 9/2010 | Koshi et al. | |
| 2010/0296532 A1 | 11/2010 | Tanaka et al. | |
| 2015/0063384 A1* | 3/2015 | Miyata | ................. H01S 5/0687 |
| | | | 372/20 |
| 2018/0026426 A1 | 1/2018 | Kawakita et al. | |
| 2019/0363505 A1 | 11/2019 | Kawakita et al. | |
| 2020/0212650 A1* | 7/2020 | Komatsu | ............. H01S 5/06256 |

FOREIGN PATENT DOCUMENTS

| | | |
|---|---|---|
| CN | 107431331 A | 12/2017 |
| JP | 2003-283044 A | 10/2003 |
| JP | 2012-119482 A | 6/2012 |
| JP | 2015-106664 A | 6/2015 |
| JP | 2016-178283 A | 10/2016 |
| JP | 6241931 B2 | 12/2017 |
| WO | WO 2018/146749 A1 | 8/2018 |

\* cited by examiner

| CH No. | REFERENCE WAVELENGTH [nm] | CONTROL REFERENCE VALUE | REFERENCE ELECTRIC POWER [W] | MODE IDENTIFICATION INFORMATION |
|---|---|---|---|---|
| 1 | $\lambda_1$ | $Pd_1$ | $PW_1$ | A |
| 2 | $\lambda_2$ | $Pd_2$ | $PW_2$ | A |
| ⋮ | ⋮ | ⋮ | ⋮ | ⋮ |
| X-1 | $\lambda_{X-1}$ | $Pd_{X-1}$ | $PW_{X-1}$ | A |
| X | $\lambda_X$ | $Pd_X$ | $PW_X$ | A |
| X+1 | $\lambda_{X+1}$ | $Pd_{X+1}$ | $PW_{X+1}$ | B |
| X+2 | $\lambda_{X+2}$ | $Pd_{X+2}$ | $PW_{X+2}$ | B |
| ⋮ | ⋮ | ⋮ | ⋮ | ⋮ |

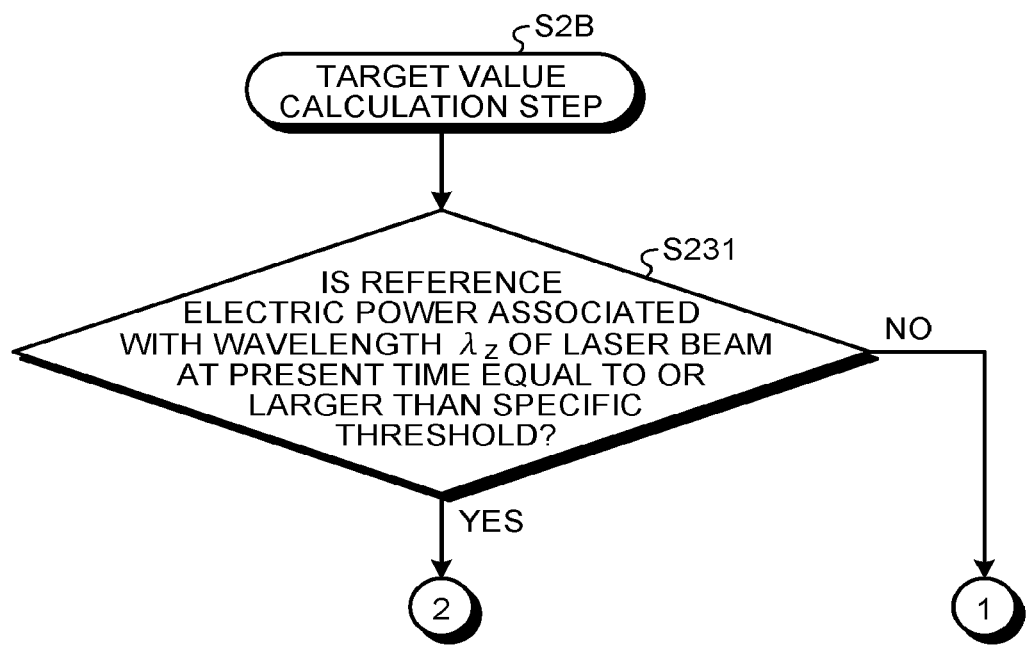

FIG.13

| CH No. | REFERENCE WAVELENGTH [nm] | CONTROL REFERENCE VALUE | REFERENCE ELECTRIC POWER [W] | MODE IDENTIFICATION INFORMATION | CONTROL REFERENCE VALUE | REFERENCE ELECTRIC POWER [W] | MODE IDENTIFICATION INFORMATION |
|---|---|---|---|---|---|---|---|
| 1 | $\lambda_1$ | $PDA_1$ | $PWA_1$ | A | | | |
| 2 | $\lambda_2$ | $PDA_2$ | $PWA_2$ | A | | | |
| ... | ... | ... | ... | ... | | | |
| X-m | $\lambda_{X-m}$ | $PDA_{X-m}$ | $PWA_{X-m}$ | A | | | |
| X-m+1 | $\lambda_{X-m+1}$ | $PDA_{X-m+1}$ | $PWA_{X-m+1}$ | A | $PDB_{X-m+1}$ | $PWB_{X-m+1}$ | B |
| ... | ... | ... | ... | ... | ... | ... | ... |
| X-2 | $\lambda_{X-2}$ | $PDA_{X-2}$ | $PWA_{X-2}$ | A | $PDB_{X-2}$ | $PWB_{X-2}$ | B |
| X-1 | $\lambda_{X-1}$ | $PDA_{X-1}$ | $PWA_{X-1}$ | A | $PDB_{X-1}$ | $PWB_{X-1}$ | B |
| X | $\lambda_X$ | $PDA_X$ | $PWA_X$ | A | $PDB_X$ | $PWB_X$ | B |
| X+1 | $\lambda_{X+1}$ | $PDA_{X+1}$ | $PWA_{X+1}$ | A | $PDB_{X+1}$ | $PWB_{X+1}$ | B |
| X+2 | $\lambda_{X+2}$ | $PDA_{X+2}$ | $PWA_{X+2}$ | A | $PDB_{X+2}$ | $PWB_{X+2}$ | B |
| ... | ... | ... | ... | ... | ... | ... | ... |
| X+n-1 | $\lambda_{X+n-1}$ | $PDA_{X+n-1}$ | $PWA_{X+n-1}$ | | $PDB_{X+n-1}$ | $PWB_{X+n-1}$ | B |
| X+n | $\lambda_{X+n}$ | | | | $PDB_{X+n}$ | $PWB_{X+n}$ | B |
| ... | ... | | | | ... | ... | ... |

WAVELENGTH-TUNABLE LASER DEVICE AND WAVELENGTH CONTROL METHOD

CROSS-REFERENCE TO RELATED APPLICATION(S)

This application is a continuation of International Application No. PCT/JP2020/005467, filed on Feb. 13, 2020 which claims the benefit of priority of the prior Japanese Patent Application No. 2019-024919, filed on Feb. 14, 2019, the entire contents of which are incorporated herein by reference.

BACKGROUND

The present disclosure relates to a wavelength-tunable laser device and a wavelength control method.

In the related art, there is known a wavelength-tunable laser device that tunes an emission wavelength of a laser beam using the Vernier effect (for example, refer to Japanese Patent No. 6241931).

The wavelength-tunable laser device disclosed in Japanese Patent No. 6241931 includes a wavelength-tunable light source part configured to tune an emission wavelength of a laser beam using the Vernier effect, an optical filter such as an etalon having a periodic transmission characteristic for a wavelength of the laser beam output from the wavelength-tunable light source part, a light receiving element that acquires intensity of the laser beam transmitted through the optical filter, and a control device that controls an operation of the wavelength-tunable light source part.

The control device calculates a monitor value corresponding to the wavelength of the laser beam based on the intensity of the laser beam acquired by the light receiving element. The control device stores, at predetermined wavelength intervals, a plurality of pieces of wavelength control information obtained by associating a reference wavelength, a control reference value that is derived from the transmission characteristic of the optical filter to be a reference value of the monitor value, and initial electric power to be supplied to a heater of the wavelength-tunable light source part with each other. Additionally, in a case in which the stored pieces of wavelength control information do not include the same reference wavelength as a target wavelength of the laser beam, the control device calculates a control target value corresponding to the target wavelength to be a target value of the monitor value using the pieces of wavelength control information. The control device then controls the operation of the wavelength-tunable light source part so that the monitor value agrees with the control target value.

SUMMARY

There is a need for providing a wavelength-tunable laser device and wavelength control method in which an appropriate control target value can be calculated, and a wavelength of a laser beam can be controlled to be a target wavelength with high accuracy.

According to an embodiment, a wavelength-tunable laser device includes: a wavelength-tunable light source part tuning an emission wavelength of a laser beam using a Vernier effect; an optical filter having a periodic transmission characteristic for a wavelength of the laser beam output from the wavelength-tunable light source part; a light receiving element acquiring intensity of the laser beam transmitted through the optical filter; and a control device controlling an operation of the wavelength-tunable light source part. Further, the control device includes: a monitor value calculating part calculating a monitor value corresponding to the wavelength of the laser beam based on the intensity of the laser beam acquired by the light receiving element; a storage part storing a plurality of pieces of wavelength control information; a target value calculating part calculating a control target value corresponding to a target wavelength of the laser beam as a target value of the monitor value based on the wavelength control information and the target wavelength; and a wavelength control part controlling the wavelength of the laser beam to be the target wavelength based on the control target value and the monitor value. Further, the wavelength control information is information in which a wavelength, a control reference value corresponding to the wavelength as a reference value of the monitor value, and mode identification information for identifying a super mode that is determined in a case in which the control reference value is caused to be the control target value are associated with each other, and the target value calculating part calculates the control target value based on a plurality of pieces of the wavelength control information stored in the storage part in association with the same mode identification information in a case in which the same wavelength as the target wavelength is different from the pieces of wavelength control information stored in the storage part.

According to an embodiment, a wavelength control method performed by a control device of a wavelength-tunable laser device, in which the wavelength-tunable laser device includes: a wavelength-tunable light source part tuning an emission wavelength of a laser beam using a Vernier effect; an optical filter having a periodic transmission characteristic for a wavelength of the laser beam output from the wavelength-tunable light source part; a light receiving element acquiring intensity of the laser beam transmitted through the optical filter; and the control device controlling an operation of the wavelength-tunable light source part, and the control device includes a storage part configured to store a plurality of pieces of wavelength control information. Further, the wavelength control method includes: calculating a monitor value corresponding to the wavelength of the laser beam based on the intensity of the laser beam acquired by the light receiving element; calculating a control target value corresponding to a target wavelength of the laser beam as a target value of the monitor value based on the wavelength control information and the target wavelength; and controlling the wavelength of the laser beam to be the target wavelength based on the control target value and the monitor value. Further, the wavelength control information is information in which a wavelength, a control reference value corresponding to the wavelength as a reference value of the monitor value, and mode identification information for identifying a super mode that is determined in a case in which the control reference value is caused to be the control target value are associated with each other, and at the calculating the control target value, the control target value is calculated based on the pieces of wavelength control information stored in the storage part in association with the same mode identification information in a case in which the same wavelength as the target wavelength is different from the pieces of wavelength control information stored in the storage part.

BRIEF DESCRIPTION OF THE DRAWINGS

FIG. 12 is a flowchart illustrating a target value calculation step (Step S2B) according to a third embodiment; and FIG. 13 is a diagram illustrating a plurality of pieces of wavelength control information stored in a storage part in a fourth embodiment.

DETAILED DESCRIPTION

Figure 1:
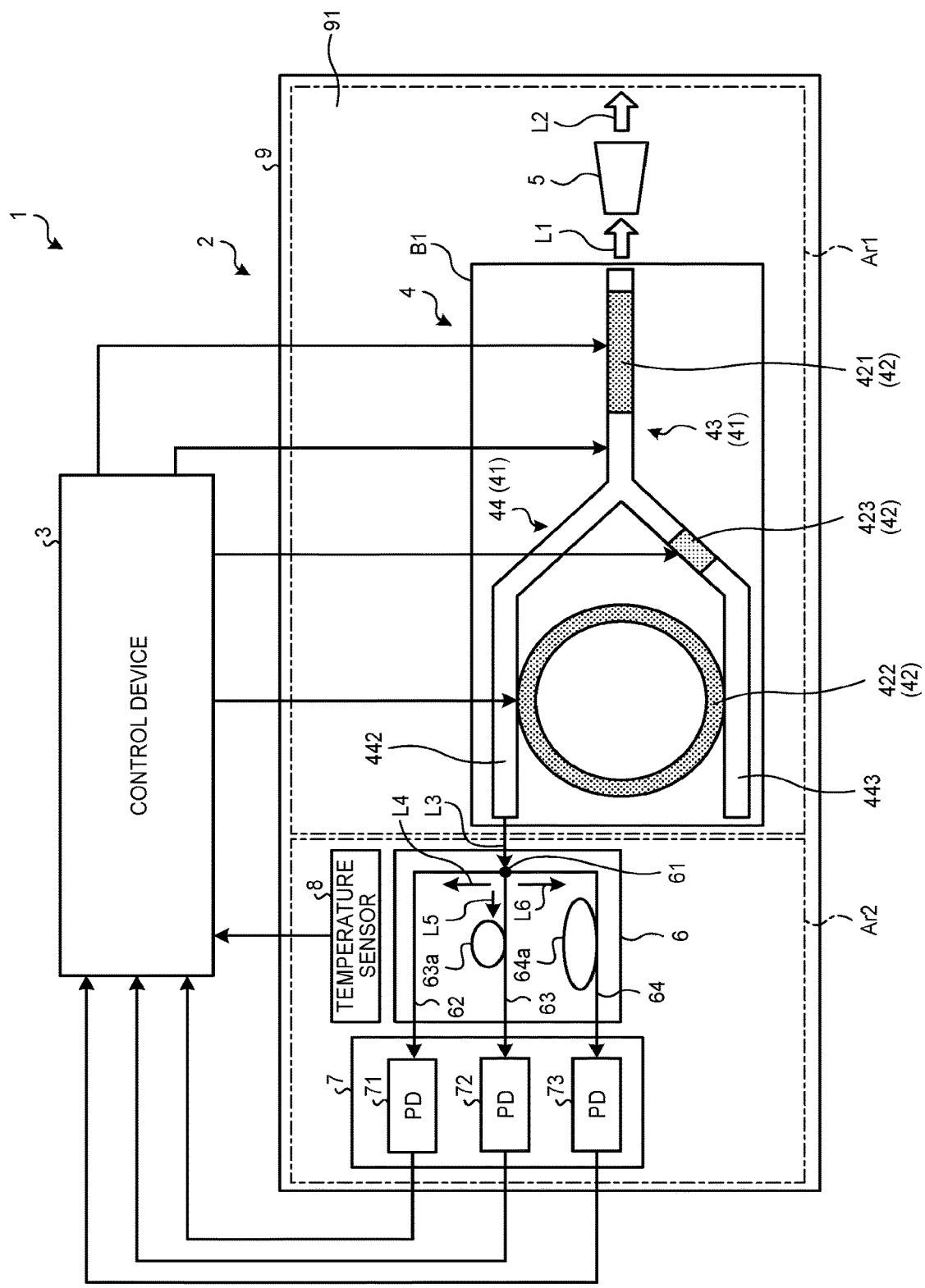
FIG. 1 is a diagram illustrating a configuration of a wavelength-tunable laser device according to a first embodiment.

In the related art, the wavelength-tunable laser device disclosed in Japanese Patent No. 6241931 implements a wide-band tunable wavelength due to the Vernier effect described below by combining and using two reflective elements that respectively generate two reflection spectra in which reflection peaks are periodically disposed on a wavelength axis, and wavelength intervals between reflection peaks are different from each other.

As described above, two reflection spectra respectively generated by the two reflective elements are different from each other in the wavelength intervals between the reflection peaks. Thus, only one of the reflection peaks included therein agrees with the other one thereof at the same time. When an optical resonator is formed by wavelengths including the agreed reflection peaks, laser emission is caused (a state in which one super mode is determined). Additionally, when the wavelength of one of the reflection spectra is changed from this state by changing a refractive index, the reflection peak agreeing with that of the other reflection spectrum is replaced with the reflection peak of the other wavelength. Accordingly, the optical resonator is formed by wavelengths different from the previous wavelengths to cause laser emission (a state in which a super mode different from the super mode described above is determined).

The wavelength-tunable laser device disclosed in Japanese Patent No. 6241931 has the problem that, in a case of setting the target wavelength between reference wavelengths where the super mode is switched, an appropriate control target value corresponding to the target wavelength cannot be calculated. In the following description, one of super modes is referred to as a first super mode, the reference wavelength in the first super mode is referred to as a first reference wavelength, and the control reference value corresponding to the first reference wavelength is referred to as a first control reference value. The other super mode is referred to as a second super mode, the reference wavelength in the second super mode is referred to as a second reference wavelength, and the control reference value corresponding to the second reference wavelength is referred to as a second control reference value.

Even if the first and the second reference wavelengths are wavelengths close to each other, the super modes thereof are different from each other, so that a difference between the initial electric power corresponding to the first reference wavelength (initial electric power supplied to the heater of the wavelength-tunable light source part) and the initial electric power corresponding to the second reference wavelength (initial electric power supplied to the heater of the wavelength-tunable light source part) becomes large as compared with a case in which the super modes are the same. That is, the transmission characteristic of the optical filter in a case in which the wavelength of the laser beam is caused to be the first reference wavelength (hereinafter, referred to as a first transmission characteristic) and the transmission characteristic of the optical filter in a case in which the wavelength of the laser beam is caused to be the second reference wavelength (hereinafter, referred to as a second transmission characteristic) may be shifted from each other in a wavelength axis direction because of the large difference in the initial electric power (because of a difference in an amount of heat flowing into the optical filter from the heater). Thus, in a case of calculating the control target value corresponding to the target wavelength between the first and the second reference wavelengths from the first control reference value that is set in accordance with the first transmission characteristic and the second control reference value that is set in accordance with the second transmission characteristic, the control target value is calculated from the first and the second transmission characteristics shifted from each other, so that an appropriate control target value cannot be calculated.

Accordingly, there has been a demand for a technique capable of calculating an appropriate control target value, and controlling the wavelength of the laser beam to be the target wavelength with high accuracy.

The following describes aspects (hereinafter referred to as embodiments) for carrying out the present disclosure with reference to the drawings. The present disclosure is not limited to the embodiments described below. In the drawings, the same portion is denoted by the same reference numeral. The drawings are schematic only, and a relation between dimensions of respective elements, a ratio between the respective elements, and the like may be different from an actual relation or ratio in some cases. Additionally, the relation between the dimensions or the ratio may be different between the drawings. In the drawings, xyz coordinate axes are appropriately illustrated to explain directions.

First Embodiment

Schematic Configuration of Wavelength-Tunable Laser Device

FIG. 1 is a diagram illustrating a configuration of a wavelength-tunable laser device 1 according to a first embodiment.

The wavelength-tunable laser device 1 includes a modularized wavelength-tunable laser module 2, and a control device 3 that controls an operation of the wavelength-tunable laser module 2.

In FIG. 1, the wavelength-tunable laser module 2 and the control device 3 are separately configured, but the members 2 and 3 may be integrally modularized.

Configuration of Wavelength-Tunable Laser Module

The wavelength-tunable laser module 2 is configured to tune a wavelength of a laser beam to be output to any target wavelength under control by the control device 3, and outputs the laser beam having the target wavelength. The wavelength-tunable laser module 2 includes a wavelength-tunable light source part 4, a semiconductor optical amplifier (SOA) 5, a planar lightwave circuit (PLC) 6, an optical detection part 7, a temperature sensor 8, and a temperature regulator 9.

Figure 2:
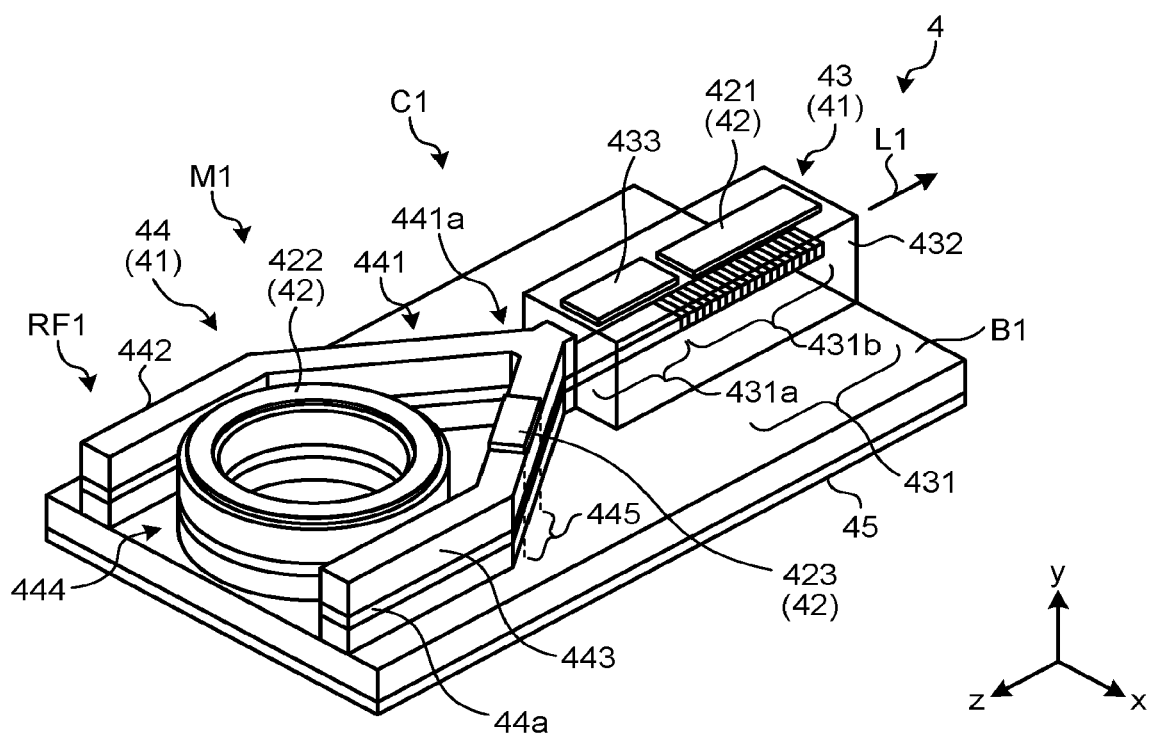
FIG. 2 is a diagram illustrating a configuration of a wavelength-tunable light source part.

FIG. 2 is a diagram illustrating a configuration of the wavelength-tunable light source part 4.

The wavelength-tunable light source part 4 is a wavelength-tunable laser utilizing the Vernier effect, and outputs a laser beam L1 under control by the control device 3. The wavelength-tunable light source part 4 includes a light source part 41 that is configured to tune the laser beam L1 to be output, and a wavelength-tunable part 42 including three microheaters 421 to 423, which generate heat in accordance with electric power supplied from the control device 3, to locally heat the light source part 41 to change a wavelength of the laser beam L1 output from the light source part 41.

The light source part 41 includes first and second waveguide parts 43 and 44 that are respectively formed on a common base B1. The base B1 may be constituted of n-type InP, for example. An n-side electrode 45 is formed on a back surface of the base B1, the n-side electrode 45 containing AuGeNi, for example, and being in ohmic contact with the base B1.

A first waveguide part 43 has an embedded waveguide structure. The first waveguide part 43 includes a waveguide part 431, a semiconductor layer part 432, and a p-side electrode 433.

The waveguide part 431 is formed to extend in the z-direction inside the semiconductor layer part 432.

A gain part 431a and a diffraction grating layer 431b of a distributed bragg reflector (DBR) type are disposed in the first waveguide part 43.

Herein, the gain part 431a is an active layer including an optical confinement layer and a multiple quantum well structure made of InGaAsP. The diffraction grating layer 431b is constituted of a sampling diffraction grating made of InGaAsP and InP.

The semiconductor layer part 432 is configured by laminating InP-based semiconductor layers, and has a function of a cladding portion and the like for the waveguide part 431.

The p-side electrode 433 is disposed along the gain part 431a on the semiconductor layer part 432. An SiN protective film (not illustrated) is formed on the semiconductor layer part 432. The p-side electrode 433 is in contact with the semiconductor layer part 432 via an opening (not illustrated) formed on the SiN protective film.

The microheater 421 is disposed along the diffraction grating layer 431b on the SiN protective film of the semiconductor layer part 432. The microheater 421 generates heat in accordance with electric power supplied from the control device 3, and heats the diffraction grating layer 431b. The temperature of the diffraction grating layer 431b is changed by controlling electric power supplied to the microheater 421 from the control device 3, and a refractive index thereof is changed.

A second waveguide part 44 includes a bifurcated part 441, two arm parts 442 and 443, and a ring-shaped waveguide 444.

The bifurcated part 441 is constituted of a branched waveguide of 1×2 type including a multi-mode interference (MMI) waveguide 441a of 1×2 type, two ports thereof are respectively connected to the two arm parts 442 and 443, and one port thereof is connected to the first waveguide part 43. That is, one end of the arm part 442 and one end of the arm part 443 are integrated with each other by the bifurcated part 441 to be optically coupled with the diffraction grating layer 431b.

Both of the arm parts 442 and 443 extend in the z-direction, and are disposed across the ring-shaped waveguide 444. These arm parts 442 and 443 are optically coupled to the ring-shaped waveguide 444 with the same coupling coefficient κ as that of the ring-shaped waveguide 444. A value of κ is 0.2, for example. The arm parts 442 and 443, and the ring-shaped waveguide 444 constitute a ring resonator filter RF1. The ring resonator filter RF1 and the bifurcated part 441 constitute a reflective mirror M1.

The microheater 422 has a ring shape, and is disposed on the SiN protective film (not illustrated) that is formed to cover the ring-shaped waveguide 444. The microheater 422 generates heat in accordance with electric power supplied from the control device 3, and heats the ring-shaped waveguide 444. The temperature of the ring-shaped waveguide 444 is changed by controlling electric power supplied to the microheater 422 from the control device 3, and the refractive index thereof is changed.

Each of the bifurcated part 441, the arm parts 442 and 443, and the ring-shaped waveguide 444 described above has a high-mesa waveguide structure in which an optical waveguide layer 44a made of InGaAsP is held between cladding layers made of InP.

The microheater 423 is disposed on the SiN protective film (not illustrated) as part of the arm part 443. A region under the microheater 423 of the arm part 443 functions as a phase adjustment part 445 that changes a phase of light. The microheater 423 generates heat in accordance with electric power supplied from the control device 3, and heats the phase adjustment part 445. The temperature of the phase adjustment part 445 is changed by controlling electric power supplied to the microheater 423 from the control device 3, and the refractive index thereof is changed.

The first and the second waveguide parts 43 and 44 described above constitute an optical resonator C1 constituted of the diffraction grating layer 431b and the reflective mirror M1 that are optically connected to each other. The gain part 431a and the phase adjustment part 445 are disposed in the optical resonator C1.

Figure 3A:
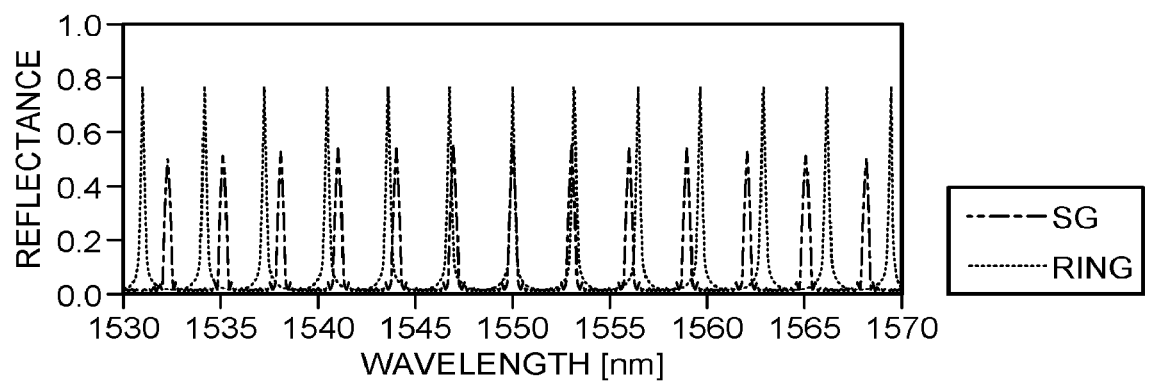
FIG. 3A is a diagram illustrating first and second comb-like reflection spectra.
Figure 3B:
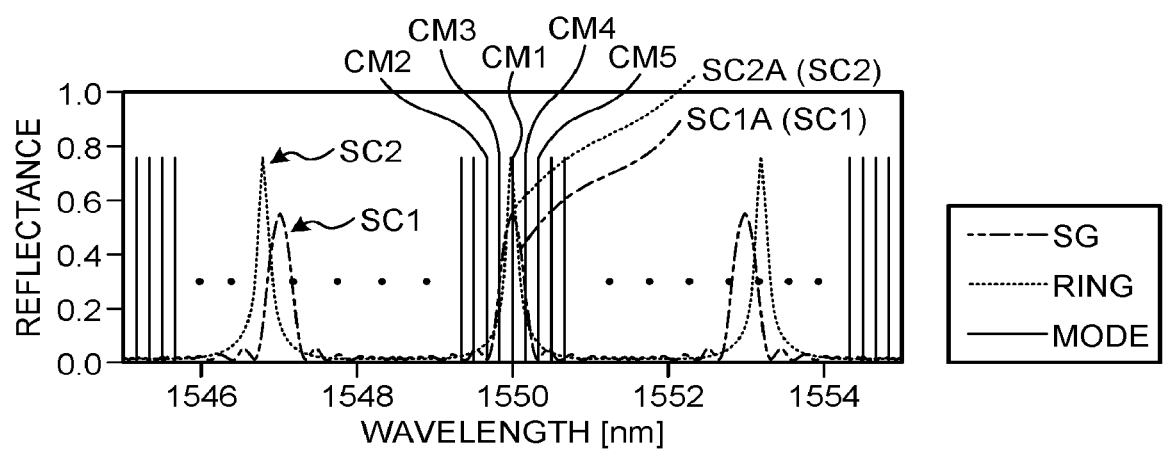
FIG. 3B is a diagram illustrating the first and the second comb-like reflection spectra.
Figure 4:
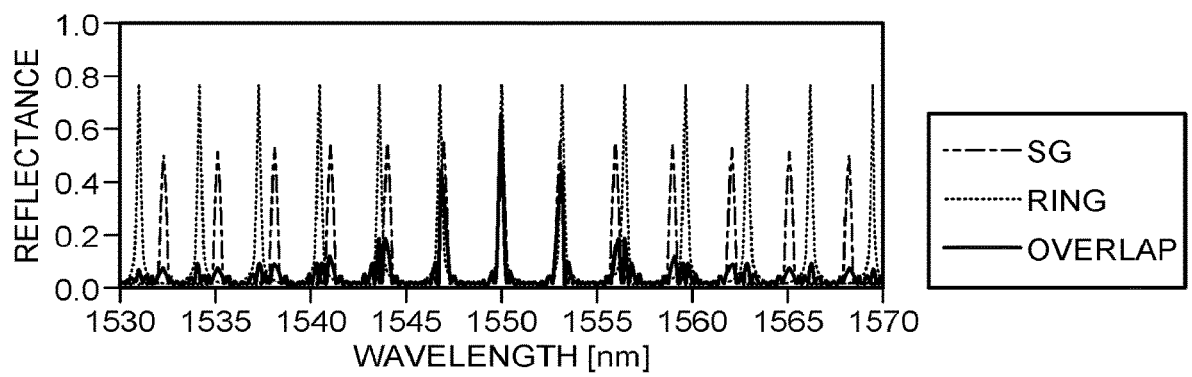
FIG. 4 is a diagram corresponding to FIG. 3A, and illustrating overlap of the first and the second comb-like reflection spectra.

FIGS. 3A and 3B are diagrams illustrating first and second comb-like reflection spectra. Specifically, in FIGS. 3A and 3B, a horizontal axis indicates a wavelength, and a vertical axis indicates a reflectance. FIG. 3B is a diagram enlarging the vicinity of 1550 nm of the first and the second comb-like reflection spectra in FIG. 3A. FIG. 4 is a diagram corresponding to FIG. 3A, and illustrating overlap of the first and the second comb-like reflection spectra.

Next, the following describes reflection characteristics of the diffraction grating layer 431b and the ring resonator filter RF1 with reference to FIG. 3 and FIG. 4.

The diffraction grating layer 431b generates the first comb-like reflection spectrum having a periodic reflection characteristic at predetermined wavelength intervals as indicated by a curved line illustrated in FIG. 3 as a legend "SG". On the other hand, the ring resonator filter RF1 generates the second comb-like reflection spectrum having a periodic reflection characteristic at predetermined wavelength intervals as indicated by a curved line illustrated in FIG. 3 as a legend "Ring".

The second comb-like reflection spectrum has a peak SC2 (FIG. 3B) having a full width at half maximum narrower than a full width at half maximum of a peak SC1 (FIG. 3B) of the first comb-like reflection spectrum, and has a periodic reflection characteristic at wavelength intervals different from the wavelength intervals of the first comb-like reflection spectrum. However, considering chromatic dispersion of the refractive index, it should be noted that the peak SC1 (SC2) does not have exactly equal wavelength intervals.

As illustrating an example of the characteristics of the first and the second comb-like reflection spectra, the wavelength interval between peaks SC1 of the first comb-like reflection spectrum (free spectrum region: FSR) is 373 GHz as an optical frequency. In the first comb-like reflection spectrum, the full width at half maximum of the peak SC1 is 43 GHz as an optical frequency. On the other hand, the wavelength interval (FSR) between peaks SC2 of the second comb-like reflection spectrum is 400 GHz as an optical frequency. In the second comb-like reflection spectrum, the full width at half maximum of the peak SC2 is 25 GHz as an optical frequency. That is, the wavelength interval between the peaks SC2 of the second comb-like reflection spectrum (400 GHz) is wider than the wavelength interval between the peaks SC1 of the first comb-like reflection spectrum (373 GHz). Additionally, the full width at half maximum of the peak SC2 of the second comb-like reflection spectrum (25 GHz) is narrower than the full width at half maximum of the peak SC1 of the first comb-like reflection spectrum (43 GHz).

The wavelength-tunable light source part 4 is configured to be able to overlap one of the peaks SC1 of the first comb-like reflection spectrum and one of the peaks SC2 of the second comb-like reflection spectrum on a wavelength axis to implement laser emission. In FIG. 4, a curved line illustrated as a legend "Overlap" indicates overlap of the first and the second comb-like reflection spectra. In the example illustrated in FIG. 4, the overlap is the largest at the wavelength of 1550 nm. In FIG. 3B, for convenience of explanation, among the peaks SC1 of the first comb-like reflection spectrum, the peak SC1 overlapping one of the peaks SC2 of the second comb-like reflection spectrum at the wavelength of 1550 nm is assumed to be a peak SC1A. Similarly, among the peaks SC2 of the second comb-like reflection spectrum, the peak SC2 overlapping the peak SC1A is assumed to be a peak SC2A.

The overlap as described above can be implemented by using at least one of the microheaters 421 and 422 and performing at least one of the following: heating the diffraction grating layer 431b by the microheater 421 to change the refractive index thereof due to a thermooptic effect, and moving the first comb-like reflection spectrum as a whole on the wavelength axis to be changed (hereinafter referred to as first refractive index change processing); and heating the ring-shaped waveguide 444 by the microheater 422 to change the refractive index thereof, and moving the second comb-like reflection spectrum as a whole on the wavelength axis to be changed (hereinafter referred to as second refractive index change processing).

On the other hand, in the wavelength-tunable light source part 4, cavity modes (longitudinal modes) by the optical resonator C1 are present as illustrated in FIG. 3B as a legend "Mode". The cavity modes are present at least over a wavelength range from 1530 nm to 1570 nm illustrated in FIG. 3A, but only part of the cavity modes is illustrated in the drawing. In the wavelength-tunable light source part 4, a cavity length of the optical resonator C1 is set so that an interval between the cavity modes (interval of the longitudinal mode) is equal to or smaller than 25 GHz. In a case of this setting, the cavity length of the optical resonator C1 is equal to or larger than 1800 μm, so that it can be expected that a linewidth of an emitted laser beam is narrowed. The wavelength of the cavity mode of the optical resonator C1 can be finely adjusted by heating the phase adjustment part 445 using the microheater 423 to change the refractive index thereof, and moving the wavelength of the cavity mode as a whole on the wavelength axis. That is, the phase adjustment part 445 is a portion for actively controlling an optical path length of the optical resonator C1.

The wavelength-tunable light source part 4 is configured such that, when the control device 3 causes an electric current to be injected into the gain part 431a from the n-side electrode 45 and the p-side electrode 433, and causes the gain part 431a to emit light, laser emission is caused at a wavelength at which the peak SC1 of the first comb-like reflection spectrum, the peak SC2 of the second comb-like reflection spectrum, and one of the cavity modes of the optical resonator C1 agree with each other, and the laser beam L1 is output.

Figure 5:
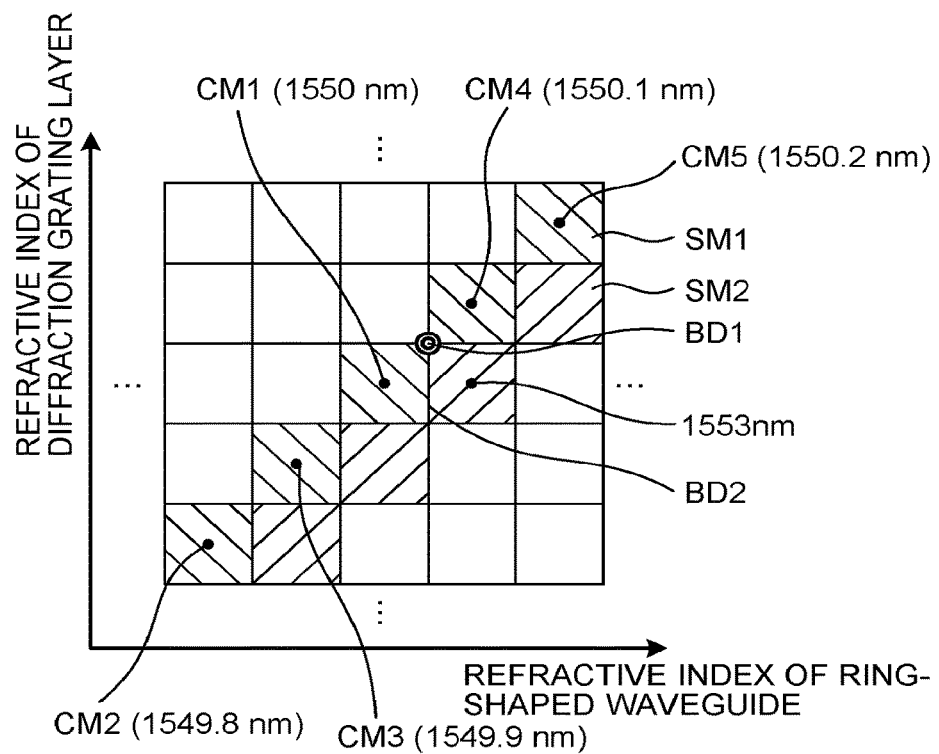
FIG. 5 is a diagram schematically illustrating a relation between refractive indexes of a diffraction grating layer and a ring-shaped waveguide, and a super mode and a cavity mode.

FIG. 5 is a diagram schematically illustrating a relation between refractive indexes of the diffraction grating layer 431b and the ring-shaped waveguide 444, and the super mode and the cavity mode. Specifically, in FIG. 5, a horizontal axis indicates the refractive index of the ring-shaped waveguide 444, and a vertical axis indicates the refractive index of the diffraction grating layer 431b. In FIG. 5, a plurality of figures illustrated as squares continuous from lower left to upper right in an oblique direction mean that the super mode to be determined is the same. In FIG. 5, for convenience of explanation, among a plurality of the super modes, only the first and the second super modes SM1 and SM2 are represented by oblique lines. In FIG. 5, dots CM1 to CM5 added to the square figures each indicate one of the cavity modes. More specifically, the dot CM1 indicates the cavity mode CM1 of 1550 nm illustrated in FIG. 3B. The dot CM2 indicates the cavity mode CM2 of 1549.8 nm illustrated in FIG. 3B. The dot CM3 indicates the cavity mode CM3 of 1549.9 nm illustrated in FIG. 3B. The dot CM4 indicates the cavity mode CM4 of 1550.1 nm illustrated in FIG. 3B. The dot CM5 indicates the cavity mode CM5 of 1550.2 nm illustrated in FIG. 3B.

Next, the following describes a method of selecting a laser emission wavelength for the wavelength-tunable light source part 4 with reference to FIG. 3 to FIG. 5.

As described below, the wavelength-tunable light source part 4 can select the laser emission wavelength utilizing the Vernier effect.

For example, at least one of the first refractive index change processing and the second refractive index change processing is performed to overlap the peak SC1A of the first comb-like reflection spectrum and the peak SC2A of the second comb-like reflection spectrum at 1550 nm as illustrated in FIG. 3 and FIG. 4. As a result, it will be a state that the first super mode SM1 is determined for causing laser emission at 1550 nm. Additionally, the phase adjustment part 445 is tuned to finely adjust the cavity mode, and the cavity mode CM1 is caused to overlap the respective peaks SC1A and SC2A overlapping each other at 1550 nm to implement laser emission at 1550 nm.

By performing both of the first refractive index change processing and the second refractive index change processing while maintaining the state in which the peaks SC1A and SC2A overlap each other, the first and the second comb-like reflection spectra can be moved as a whole on the wavelength axis, and the overlapping peaks SC1A and SC2A can be caused to overlap each of the cavity modes CM2 to CM5 to implement laser emission at 1549.8 nm, 1549.9 nm, 1550.1 nm, and 1550.2 nm, respectively. At this point, the state in which the peaks SC1A and SC2A overlap each other is maintained, so that the super mode is also maintained to be the first super mode SM1. That is, in the first super mode SM1, laser emission can be implemented in a specific emission wavelength range (hereinafter referred to as a first emission wavelength range).

As described above, the "super mode" herein means laser emission in a state in which one of the peaks SC1 of the first comb-like reflection spectrum and one of the peaks SC2 of the second comb-like reflection spectrum overlap with each other.

In FIG. 5, a boundary (dot) between the square figures adjacent to each other in the oblique direction from the lower left to the upper right means a case in which the overlapping peaks SC1 and SC2 in the first and the second comb-like reflection spectra are positioned at a midpoint between the respective cavity modes in the adjacent square figures. In this case, laser emission (multi-mode emission) is caused at respective wavelengths of the cavity modes. For example, a boundary BD1 means a case in which the overlapping peaks SC1A and SC2A are positioned at a midpoint between the cavity modes CM1 and CM4. In this case, laser emission (multi-mode emission) is caused at 1550 nm in the cavity mode CM1 and 1550.1 nm in the cavity mode CM4.

Additionally, for example, when any one of the first refractive index change processing and the second refractive index change processing is performed from the states illustrated in FIG. 3B and FIG. 4, any one of the first and the second comb-like reflection spectra is shifted as a whole toward a long wave side or a short wave side from the state illustrated in FIG. 3B and FIG. 4. As a result, in the first and the second comb-like reflection spectra, overlap between the peaks SC1A and SC2A is released, and the other peaks SC1 and SC2 overlap each other. That is, a transition is made from a state in which the first super mode SM1 for causing laser emission at 1550 nm is determined (FIG. 3B, FIG. 4) to another super mode that can implement laser emission in an emission wavelength range different from the first emission wavelength range (for example, the second super mode SM2 for causing laser emission at 1553 nm (a super mode that can implement laser emission in a second emission wavelength range)). Additionally, by tuning the cavity mode to be finely adjusted by the phase adjustment part 445, and causing one of the cavity mode to overlap the other overlapping peaks SC1 and SC2, laser emission in the other super mode can be implemented. That is, in FIG. 5, movement to the square figure that is positioned in a vertical direction or a horizontal direction means a transition of the super mode.

In FIG. 5, a boundary (line) between the square figures adjacent to each other in the vertical direction or the horizontal direction means a case in which, among the peaks SC1 and SC2 in the first and the second comb-like reflection spectra, two pairs of the peaks SC1 and SC2 substantially agree with the respective cavity modes in the adjacent square figures. In this case, laser emission (multi-mode emission) is caused at respective wavelengths of the cavity modes. For example, a boundary BD2 means a case in which two pairs of the peaks SC1 and SC2 substantially agree with the two cavity modes respectively at 1550 nm and 1553 nm. In this case, laser emission (multi-mode emission) is caused at 1550 nm and 1553 nm.

In the first embodiment, the laser emission wavelength is made tunable by utilizing the thermooptic effect due to the microheater, but the embodiment is not limited thereto. The laser emission wavelength may be tunable by also utilizing a carrier plasma effect due to electric current injection.

Although not specifically illustrated, the semiconductor optical amplifier 5 has an embedded waveguide structure including an active core layer made of the same material and having the same structure as those of the first waveguide part 43. However, the diffraction grating layer 431b is not disposed therein. The semiconductor optical amplifier 5 is optically coupled to the wavelength-tunable light source part 4 via a space coupling optical system (not illustrated). The laser beam L1 output from the wavelength-tunable light source part 4 is input to the semiconductor optical amplifier 5. The semiconductor optical amplifier 5 amplifies the laser beam L1 to be output as a laser beam L2. The semiconductor optical amplifier 5 may also be configured monolithically with the wavelength-tunable light source part 4 on the base B1.

The planar lightwave circuit 6 is optically coupled to the arm part 442 via the space coupling optical system (not illustrated). Part of a laser beam L3, which is generated by laser emission in the wavelength-tunable light source part 4 similarly to the laser beam L1, is input to the planar lightwave circuit 6 via the arm part 442. The laser beam L3 has the same wavelength as the wavelength of the laser beam L1. The planar lightwave circuit 6 includes an optical branch part 61, a light guide 62, a light guide 63 including a ring resonator-type optical filter 63a, and a light guide 64 including a ring resonator-type optical filter 64a.

The optical branch part 61 causes the input laser beam L3 to branch into three laser beams L4 to L6.

The light guide 62 then guides the laser beam L4 to a photo diode (PD) 71 (described later) in the optical detection part 7. The light guide 63 guides the laser beam L5 to a PD 72 (described later) in the optical detection part 7. Furthermore, the light guide 64 guides the laser beam L6 to a PD 73 (described later) in the optical detection part 7.

Each of the ring resonator-type optical filters 63a and 64a has a periodic transmission characteristic for a wavelength of incident light, and selectively transmits the laser beams L5 and L6 with transmittance corresponding to the transmission characteristic. The laser beams L5 and L6 transmitted through the ring resonator-type optical filters 63a and 64a are respectively input to the PDs 72 and 73. That is, each of the ring resonator-type optical filters 63a and 64a corresponds to an optical filter. Hereinafter, for convenience of explanation, the ring resonator-type optical filter 63a and 64a is referred to as the optical filters 63a and 64a.

The optical filters 63a and 64a have transmission characteristics in which phases are different from each other in a range from ⅓ to ⅕ of one period, for example.

The optical detection part 7 includes the PDs 71 to 73.

The PD 71 receives the laser beam L4 (a laser beam equivalent to the laser beam L1 output from the wavelength-tunable light source part 4), and outputs an electric signal corresponding to the intensity of the laser beam L4 to the control device 3.

The PD 72 corresponds to a light receiving element. The PD 72 receives the laser beam L5 transmitted through the optical filter 63a, and outputs an electric signal corresponding to the intensity of the laser beam L5 to the control device 3.

The PD 73 corresponds to a light receiving element. The PD 73 receives the laser beam L6 transmitted through the optical filter 64a, and outputs an electric signal corresponding to the intensity of the laser beam L6 to the control device 3.

Electric signals respectively output from the PDs 71 to 73 are used for wavelength lock processing (processing of causing the laser beam L1 output from the wavelength-tunable light source part 4 to have a target wavelength) by the control device 3.

The temperature sensor 8 is constituted of a thermistor, for example, and detects an ambient temperature around the planar lightwave circuit 6.

The temperature regulator 9 is constituted of a thermo electric cooler (TEC) and the like including a Peltier element, for example. On the temperature regulator 9, the wavelength-tunable light source part 4, the semiconductor optical amplifier 5, the planar lightwave circuit 6, the optical detection part 7, and the temperature sensor 8 are placed. The temperature regulator 9 adjusts temperatures of the respective members 4 to 8 in accordance with supplied electric power.

In the temperature regulator 9, in a case of dividing a disposition surface 91 on which the members 4 to 8 are placed into two regions, that is, a first region Ar1 in which the wavelength-tunable light source part 4 and the semiconductor optical amplifier 5 are placed, and a second region Ar2 in which the planar lightwave circuit 6 and the optical detection part 7 are placed, the temperature sensor 8 is placed in the second region Ar2. That is, the temperature sensor 8 is disposed in the vicinity of the planar lightwave circuit 6.

Configuration of Control Device

Next, the following describes a configuration of the control device 3.

Figures 6, 7:
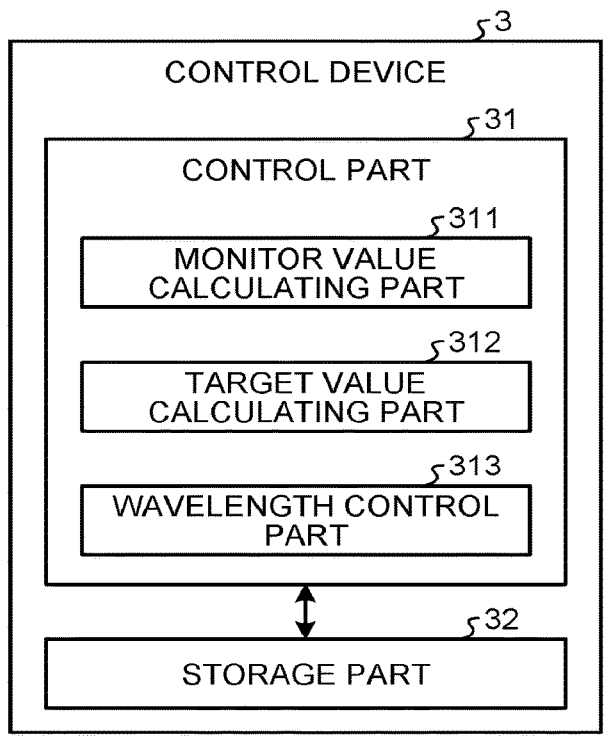
FIG. 6 is a block diagram illustrating a configuration of a control device.
FIG. 7 is a diagram illustrating a plurality of pieces of wavelength control information stored in a storage part.

FIG. 6 is a block diagram illustrating the configuration of the control device 3.

The control device 3 is connected to a host control device (not illustrated) including a user interface, for example, and controls the operation of the wavelength-tunable laser module 2 in accordance with an instruction from a user via the host control device.

The following mainly describes the wavelength lock processing performed by the control device 3. For convenience of explanation, FIG. 6 illustrates only a configuration for performing the wavelength lock processing as the configuration of the control device 3. Additionally, for convenience of explanation, among the electric signals respectively output from the PDs 72 and 73, the electric signal output from the PD 72 is used in the wavelength lock processing described below.

The control device 3 includes a control part 31 and a storage part 32.

The storage part 32 includes a ROM and the like storing various kinds of computer programs or data used for performing arithmetic processing for implementing functional parts included in the control part 31. The storage part 32 also includes a RAM and the like used as a working space for performing arithmetic processing by the control part 31, or used for recording a result of arithmetic processing by the control part 31, for example.

The control part 31 is configured by using an arithmetic device such as a central processing unit (CPU). The control part 31 includes a monitor value calculating part 311, a target value calculating part 312, and a wavelength control part 313.

The monitor value calculating part 311 calculates a monitor value corresponding to the wavelength of the laser beam L1 based on output values of the electric signals respectively output from the PDs 71, 72, and 73. Specifically, the monitor value calculating part 311 calculates, as the monitor value (hereinafter referred to as a PD ratio A), a ratio of the output value of the electric signal output from the PD 72 to the output value of the electric signal output from the PD 71. Similarly, the monitor value calculating part 311 calculates, as the monitor value (hereinafter referred to as a PD ratio B), a ratio of the output value of the electric signal output from the PD 73 to the output value of the electric signal output from the PD 71.

The PD ratio A is a ratio of the intensity detected by the PD 72 (second intensity) to the intensity detected by the PD 71 (first intensity). As a ratio corresponding to the ratio, it may also be a ratio of intensity obtained by applying a correction factor to the second intensity detected by the PD 72 to intensity obtained by applying the correction factor to the first intensity detected by the PD 71. As an amount corresponding to the ratio, a ratio may be calculated by using intensity obtained by applying the correction factor to any one of the first intensity and the second intensity.

The PD ratio B is a ratio of intensity detected by the PD 73 (third intensity) to the intensity detected by the PD 71 (first intensity). As a ratio corresponding to the ratio, it may be a ratio of intensity obtained by applying the correction factor to the third intensity detected by the PD 73 to intensity obtained by applying the correction factor to the first intensity detected by the PD 71. As an amount corresponding to the ratio, a ratio may be calculated by using intensity obtained by applying the correction factor to any one of the first intensity and the third intensity.

The correction factor for the first intensity, the second intensity, or the third intensity is previously acquired by experiment and the like, stored in the storage part 32 in a format of table data, a relational expression, and the like, and is appropriately read out to be used by the monitor value calculating part 311. The correction factor may be determined in accordance with an operation condition for the laser device 1, a temperature detected by the temperature sensor 8, and the like, for example. The correction factor may also be determined to be appropriately applied to a standardized frequency discrimination curve. The correction factor is applied to the first intensity, the second intensity, or the third intensity by using any of arithmetic operations including addition, subtraction, multiplication, and division, for example. Any of the PD ratio A and the PD ratio B may be used for controlling the wavelength, and the PD ratio A and the PD ratio B may be collectively referred to as a PD ratio in some cases hereinafter.

The target value calculating part 312 calculates various kinds of target values based on the target wavelength acquired from the host control device (not illustrated) and a plurality of pieces of wavelength control information stored in the storage part 32.

FIG. 7 is a diagram illustrating a plurality of pieces of wavelength control information stored in the storage part 32.

The wavelength control information is information in which a reference wavelength, a plurality of pieces of electric power that are supplied to the respective microheaters 421 to 423 for controlling the wavelength of the laser beam L1 to be the reference wavelength, a control reference value to be a reference value of the PD ratio in a case of setting the wavelength of the laser beam L1 to be the reference wavelength, and mode identification information for identifying the super mode that is determined in a case in which the wavelength lock processing is performed by using the pieces of electric power and the control reference value are associated with each other.

In the respective pieces of the wavelength control information of CHNo. 1 to X−1, X, X+1, X+2, . . . , reference wavelengths of $\lambda_1$ to $\lambda_{X-1}$, $\lambda_X$, $\lambda_{X+1}$, $\lambda_{X+2}$, . . . [nm] are successively increased at specific wavelength intervals as a numeral of a subscript added to a character "λ" is increased. The reference wavelength means a grid wavelength. In FIG. 7, for convenience of explanation, total electric power of the pieces of electric power supplied to the respective microheaters 421 to 423 are referred to as pieces of reference electric power $PW_1$ to $PW_{X-1}$, $PW_X$, $PW_{X+1}$, $PW_{X+2}$, . . . [W] in the respective pieces of wavelength control information of CHNo. 1 to X−1, X, X+1, X+2, . . . . In the respective pieces of wavelength control information of CHNo. 1 to X−1, and X associated with the mode identification information "A", the pieces of reference electric power $PW_1$ to $PW_{X-1}$, and $PW_X$ [W] are successively increased as a numeral of a subscript added to a character "PW" is increased. In the respective pieces of wavelength control information of CHNo. X+1, X+2, . . . associated with the mode identification information "B", the pieces of reference electric power $PW_{X+1}$, $PW_{X+2}$, . . . [W] are successively increased as a numeral of a subscript added to the character "PW" is increased.

By causing the pieces of wavelength control information to have the same mode identification information when a difference between the pieces of reference electric power associated with the respective pieces of wavelength control information of adjacent CHNos. is smaller than a predetermined threshold, and causing the pieces of wavelength control information to have different pieces of mode identification information when the difference is equal to or larger than the threshold, each piece of the mode identification information can be associated with each piece of the wavelength control information corresponding to the super mode that implements the reference wavelength in each piece of the wavelength control information.

The target value calculating part 312 calculates a control target value to be a target value of the PD ratio, pieces of initial electric power respectively supplied to the microheaters 421 to 423, and the like as various kinds of target values used in the wavelength lock processing.

More specifically, in a case in which the pieces of wavelength control information stored in the storage part 32 include the same reference wavelength as the target wavelength acquired from the host control device (not illustrated), the target value calculating part 312 calculates the control reference value associated with the reference wavelength as the control target value, and calculates the reference electric power associated with the reference wavelength as the initial electric power.

On the other hand, in a case in which the pieces of wavelength control information stored in the storage part 32 do not include the same reference wavelength as the target wavelength acquired from the host control device (not illustrated), the target value calculating part 312 calculates the control target value and the initial electric power using the pieces of wavelength control information.

The wavelength control part 313 changes the pieces of electric power to be supplied to the respective microheaters 421 to 423, and controls the wavelength of the laser beam L1 to be the target wavelength based on the PD ratio calculated by the monitor value calculating part 311 and the control target value and the initial electric power calculated by the target value calculating part 312.

Wavelength Control Method

Next, the following describes a wavelength control method performed by the control device 3 described above.

Figure 8:
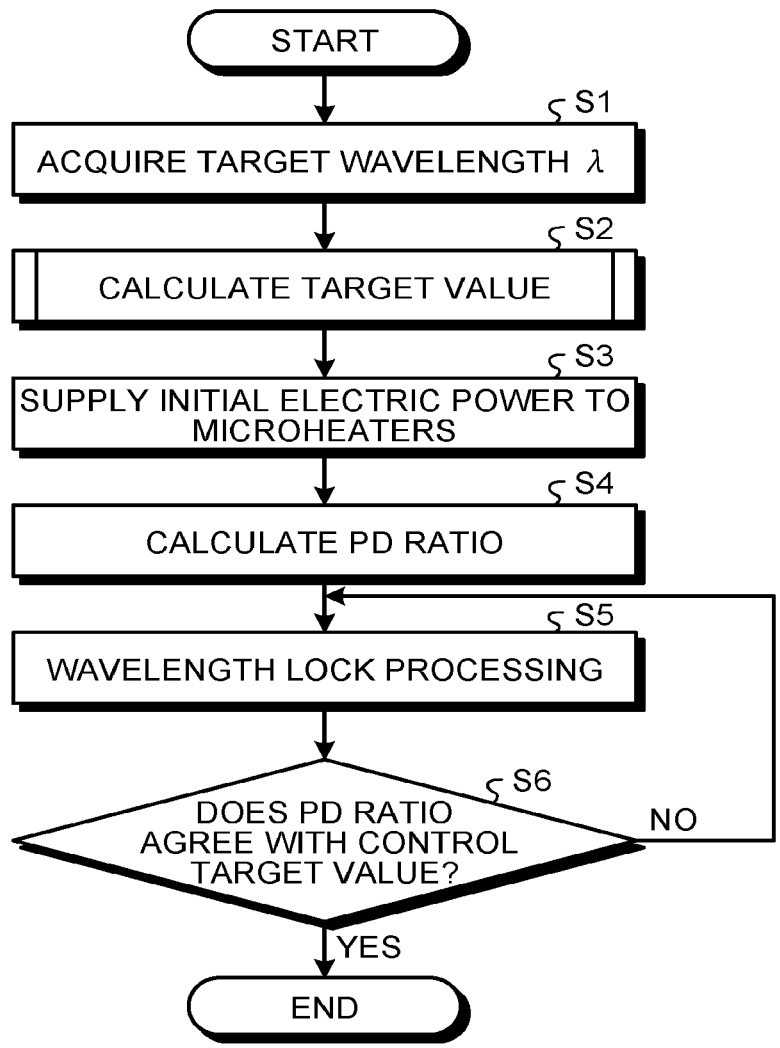
FIG. 8 is a flowchart illustrating a wavelength control method.

FIG. 8 is a flowchart illustrating the wavelength control method.

In the following description, for convenience of explanation, laser emission is assumed to be caused at a reference wavelength $\lambda_S$ included in the pieces of wavelength control information that are stored in the storage part 32 at the present time, and the following describes the wavelength control method in a case of changing the emission wavelength of the laser beam L1 from the reference wavelength $\lambda_S$ to the target wavelength λ. It is assumed that the same reference wavelength as the target wavelength λ is not included in the pieces of wavelength control information stored in the storage part 32.

First, the control device 3 acquires, via the host control device, the target wavelength λ that is input to the host control device (not illustrated) via the user interface (Step S1).

After Step S1, the target value calculating part 312 calculates various kinds of target values (the control target value and the initial electric power) as described below based on the target wavelength λ acquired at Step S1 and the pieces of wavelength control information stored in the storage part 32 (Step S2: target value calculation step).

Figure 9:
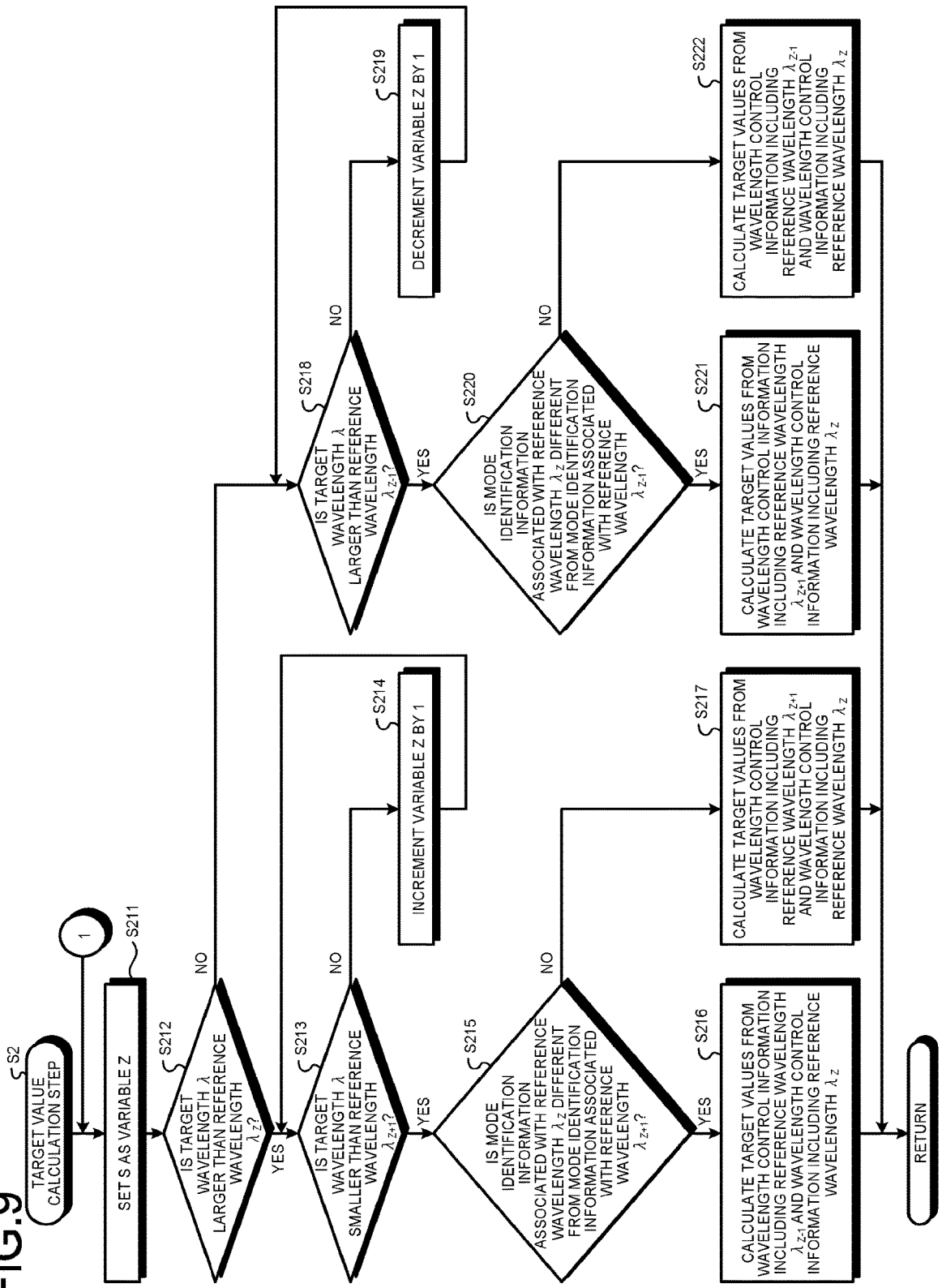
FIG. 9 is a flowchart illustrating a target value calculation step (Step S2)

FIG. 9 is a flowchart illustrating the target value calculation step (Step S2).

The target value calculating part 312 sets S indicating the wavelength (reference wavelength $\lambda_S$) of the laser beam L1 that is output from the wavelength-tunable light source part 4 at the present time as variable Z in a subscript (described below) for identifying the reference wavelength (Step S211).

After Step S211, the target value calculating part 312 determines whether the target wavelength λ acquired at Step S1 is larger than the reference wavelength $\lambda_Z$ (Step S212).

In a case of determining that the target wavelength λ is larger than the reference wavelength $\lambda_Z$ (Yes at Step S212), the target value calculating part 312 determines whether the target wavelength λ is smaller than the reference wavelength $\lambda_{Z+1}$ (Step S213). In a case of determining "No" at Step S213, the target value calculating part 312 increments the variable Z by 1 (Step S214), and returns the process to Step S213. On the other hand, in a case of determining "Yes" at Step S213 (that is, in a case in which the variable Z satisfying $\lambda_Z < \lambda < \lambda_{Z+1}$ is specified), the target value calculating part 312 performs the processing described below (Step S215).

At Step S215, the target value calculating part 312 refers to the pieces of wavelength control information stored in the storage part 32, and determines whether the mode identification information associated with the reference wavelength $\lambda_Z$ is different from the mode identification information associated with the reference wavelength $\lambda_{Z+1}$.

In a case of determining that the mode identification information associated with the reference wavelength $\lambda_Z$ is different from the mode identification information associated with the reference wavelength $\lambda_{Z+1}$ (Yes at Step S215), the target value calculating part 312 performs the processing described below (Step S216).

At Step S216, the target value calculating part 312 refers to the pieces of wavelength control information stored in the storage part 32, and calculates various kinds of target values (the control target value and the initial electric power) from the wavelength control information including the reference wavelength $\lambda_{Z-1}$ and the wavelength control information including the reference wavelength $\lambda_Z$.

Figure 10:
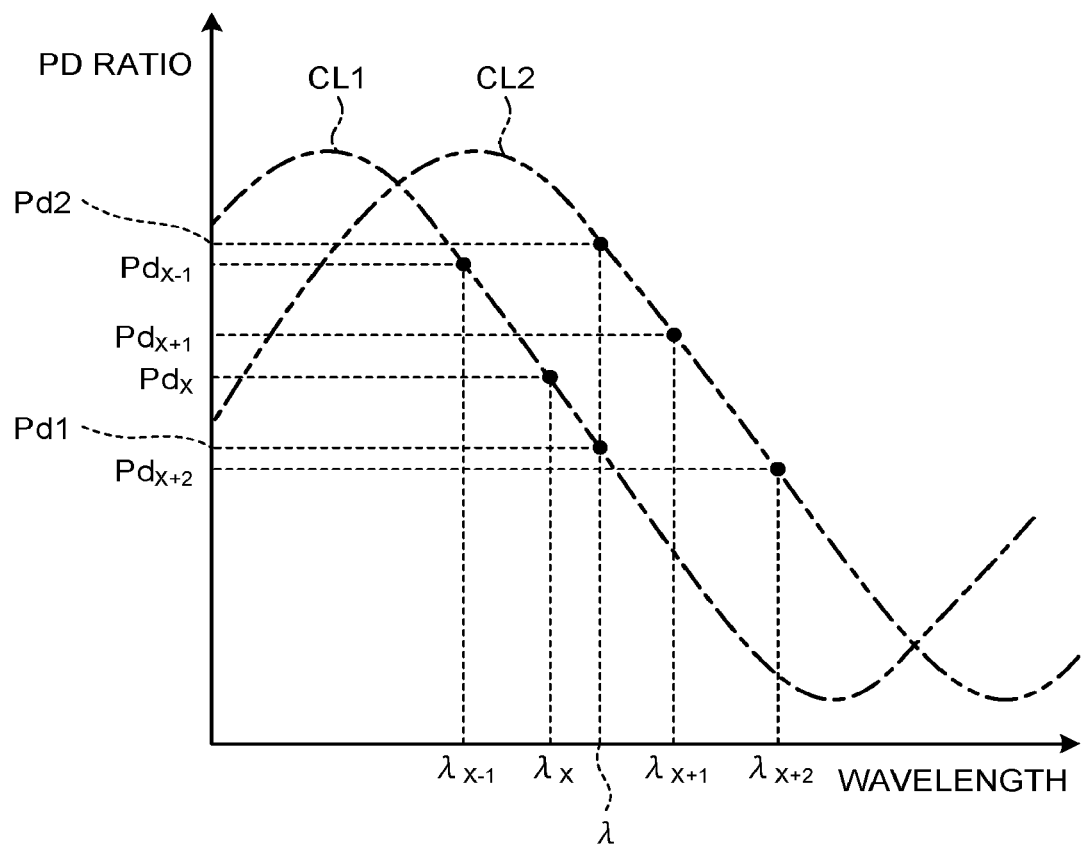
FIG. 10 is a diagram for explaining Step S216.

FIG. 10 is a diagram for explaining Step S216. Specifically, in FIG. 10, a horizontal axis indicates the wavelength, and a vertical axis indicates the PD ratio. In FIG. 10, a curved line CL1 indicates behavior of the PD ratio with respect to the wavelength (the transmission characteristic of the optical filter 63a at a first temperature) in a case in which the optical filter 63a is set at the first temperature. A curved line CL2 indicates behavior of the PD ratio with respect to the wavelength (the transmission characteristic of the optical filter 63a at a second temperature) in a case in which the optical filter 63a is set at the second temperature higher than the first temperature.

For example, in the respective pieces of the wavelength control information of CHNo. X−1 and CHNo. X illustrated in FIG. 7, a difference between the reference electric power $PW_{X−1}$ and the reference electric power $PW_X$ supplied to each of the microheaters 421 to 423 is relatively small. That is, the temperature of the optical filter 63a is substantially the same, for example, the first temperature, both in a case of supplying the reference electric power $PW_{X−1}$ to each of the microheaters 421 to 423, and in a case of supplying the reference electric power $PW_X$ to each of the microheaters 421 to 423. Thus, the reference wavelength $\lambda_{X−1}$ and the control reference value $Pd_{X−1}$ in the wavelength control information of CHNo. X−1, and the reference wavelength $\lambda_X$ and the control reference value $Pd_X$ in the wavelength control information of CHNo. X are respective dots on the curved line CL1. That is, in the same super mode defined by the mode identification information "A", the reference wavelength and the control reference value in the respective pieces of wavelength control information are represented by dots on the same curved line CL1.

In the respective pieces of wavelength control information of CHNo. X+1 and CHNo. X+2 illustrated in FIG. 7, a difference between the reference electric power $PW_{X+1}$ and the reference electric power $PW_{X+2}$ supplied to each of the microheaters 421 to 423 is small similarly to the difference between the reference electric power $PW_{X−1}$ and the reference electric power $PW_X$ described above. However, the pieces of reference electric power $PW_{X+1}$ and $PW_{X+2}$ are relatively larger than the pieces of reference electric power $PW_{X−1}$ and $PW_X$. That is, the temperature of the optical filter 63a is substantially the same, for example, the second temperature, both in a case of supplying the reference electric power $PW_{X+1}$ to each of the microheaters 421 to 423, and in a case of supplying the reference electric power $PW_{X+2}$ to each of the microheaters 421 to 423. Thus, the reference wavelength $\lambda_{X+1}$ and the control reference value $Pd_{X+1}$ in the wavelength control information of CHNo. X+1, and the reference wavelength $\lambda_{X+2}$ and the control reference value $Pd_{X+2}$ in the wavelength control information of CHNo. X+2 are respective dots on the curved line CL2. That is, in the same super mode defined by the mode identification information "B", the reference wavelength and the control reference value in the respective pieces of wavelength control information are represented by dots on the same curved line CL2.

Herein, it is assumed that the wavelength (reference wavelength $\lambda_Z$) of the laser beam L1 that is output from the wavelength-tunable light source part 4 at the present time is the reference wavelength $\lambda_X$, and $\lambda_X<\lambda<\lambda_{X+1}$ is satisfied. In this case, the wavelength control information of CHNo. X+1 is wavelength control information including the wavelength $\lambda_{X+1}$ that is adjacent to the target wavelength λ on the long wave side. The wavelength control information of CHNo. X is wavelength control information including the wavelength $\lambda_X$ that is adjacent to the target wavelength λ on the short wave side. Thus, the pieces of wavelength control information of CHNo. X+1 and CHNo. X respectively correspond to the first wavelength control information and the second wavelength control information.

The mode identification information "A" in the wavelength control information of CHNo. X is different from the mode identification information "B" in the wavelength control information of CHNo. X+1. Thus, as described above, the reference wavelength $\lambda_X$ and the control reference value $Pd_X$, and the reference wavelength $\lambda_{X+1}$ and the control reference value $Pd_{X+1}$ are represented by dots on the different curved lines CL1 and CL2. That is, in a case of assuming the wavelength between the wavelengths $\lambda_{X+1}$ and $\lambda_X$ where the super mode is switched as the target wavelength λ, and calculating the control target value corresponding to the target wavelength λ by interpolation from the reference wavelength $\lambda_X$ and the control reference value $Pd_X$, and the reference wavelength $\lambda_{X+1}$ and the control reference value $Pd_{X+1}$, the control target value is calculated from the curved lines CL1 and CL2 shifted from each other, so that an inappropriate value for the control target value is calculated. In a case of performing the wavelength lock processing using this control target value, the wavelength of the laser beam L1 cannot be controlled to be the target wavelength λ.

In the first embodiment, at Step S216, the target value calculating part 312 calculates various kinds of target values (the control target value and the initial electric power) from the wavelength control information of CHNo. X−1 including the wavelength $\lambda_{X−1}$ and the wavelength control information of CHNo. X including the wavelength $\lambda_X$, the wavelength control information of CHNo. X−1 and the wavelength control information of CHNo. X each including the reference wavelength and the control reference value represented by the dots on the same curved line CL1.

Specifically, as illustrated in FIG. 10, the target value calculating part 312 calculates a control target value Pd1 corresponding to the target wavelength λ by extrapolation from the reference wavelength $\lambda_{X−1}$ and the control reference value $Pd_{X−1}$, and the reference wavelength $\lambda_X$ and the control reference value $Pd_X$. Similarly, the target value calculating part 312 calculates initial electric power corresponding to the target wavelength λ by extrapolation from the reference wavelength $\lambda_{X−1}$ and the reference electric power $PW_{X−1}$, and the reference wavelength $\lambda_X$ and the reference electric power $PW_X$.

As described above, at Step S216, in a case in which the pieces of wavelength control information stored in the storage part 32 do not include the same reference wavelength as the target wavelength λ, and the mode identification information is different between the first wavelength control information and the second wavelength control information (the pieces of wavelength control information of CHNo. X+1 and CHNo. X), the target value calculating part 312 calculates the control target value Pd1 corresponding to the target wavelength λ using the control reference values $Pd_{X−1}$ and $Pd_X$ associated with the same mode identification information as that of the wavelength control information (wavelength control information of CHNo. X) including the wavelength $\lambda_X$ of the laser beam L1 that is output from the wavelength-tunable light source part 4 at the present time. Step S216 is an example of a step of calculating the control target value based on the pieces of wavelength control information associated with the same mode identification information stored in the storage part 32.

After Step S216, the control device 3 returns to a main routine illustrated in FIG. 8.

Returning to Step S215, in a case of determining that the mode identification information associated with the reference wavelength $\lambda_Z$ and the mode identification information associated with the reference wavelength $\lambda_{Z+1}$ are the same (No at Step S215), the target value calculating part 312 performs the processing described below (Step S217).

At Step S217, the target value calculating part 312 refers to the pieces of wavelength control information stored in the storage part 32, and calculates various kinds of target values (the control target value and the initial electric power) from the wavelength control information including the reference wavelength $\lambda_{Z+1}$ and the wavelength control information including the reference wavelength $\lambda_Z$.

The case of determining "No" at Step S215 and performing Step S217 is assumed to be the following case, for example.

That is, assumed is a case in which the wavelength (reference wavelength $\lambda_Z$) of the laser beam L1 that is output from the wavelength-tunable light source part 4 at the present time is the reference wavelength $\lambda_{X-1}$, and $\lambda_{X-1}<\lambda<\lambda_X$ is satisfied. In this case, the reference wavelength $\lambda_{X-1}$ and the control reference value $Pd_{X-1}$, and the reference wavelength $\lambda_X$ and the control reference value $Pd_X$ are respectively associated with the same mode identification information, so that they are represented by dots on the same curved line CL1 (FIGS. 7 and 10). Thus, the target value calculating part 312 calculates the control target value corresponding to the target wavelength $\lambda$ by interpolation from the reference wavelength $\lambda_{X-1}$ and the control reference value $Pd_{X-1}$, and the reference wavelength $\lambda_X$ and the control reference value $Pd_X$. Similarly, the target value calculating part 312 calculates the initial electric power corresponding to the target wavelength $\lambda$ by interpolation from the reference wavelength $\lambda_{X-1}$ and the reference electric power $PW_{X-1}$, and the reference wavelength $\lambda_X$ and the reference electric power $PW_X$. Step S217 is an example of a step of calculating the control target value based on the pieces of wavelength control information associated with the same mode identification information stored in the storage part 32.

After Step S217, the control device 3 returns to the main routine illustrated in FIG. 8.

Returning to Step S212, in a case of determining "No" at Step S212, the target value calculating part 312 determines whether the target wavelength $\lambda$ is larger than the reference wavelength $\lambda_{Z-1}$ (Step S218). In a case of determining "No" at Step S218, the target value calculating part 312 decrements the variable Z by 1 (Step S219), and returns the process to Step S218. On the other hand, in a case of determining "Yes" at Step S218 (that is, in a case in which the variable Z satisfying $\lambda_{Z-1}<\lambda<\lambda_Z$ is specified), the target value calculating part 312 performs the processing described below (Step S220).

At Step S220, the target value calculating part 312 refers to the pieces of wavelength control information stored in the storage part 32, and determines whether the mode identification information associated with the reference wavelength $\lambda_Z$ is different from the mode identification information associated with the reference wavelength $\lambda_{Z-1}$.

In a case of determining that the mode identification information associated with the reference wavelength $\lambda_Z$ is different from the mode identification information associated with the reference wavelength $\lambda_{Z-1}$ (Yes at Step S220), the target value calculating part 312 performs the processing described below (Step S221).

At Step S221, the target value calculating part 312 refers to the pieces of wavelength control information stored in the storage part 32, and calculates various kinds of target values (the control target value and the initial electric power) from the wavelength control information including the reference wavelength $\lambda_{Z+1}$ and the wavelength control information including the reference wavelength $\lambda_Z$.

The case of determining "Yes" at Step S220 and performing Step S221 is assumed to be the following case, for example.

That is, assumed is a case in which the wavelength (reference wavelength $\lambda_Z$) of the laser beam L1 that is output from the wavelength-tunable light source part 4 at the present time is the reference wavelength $\lambda_{X+1}$, and $\lambda_X<\lambda<\lambda_{X+1}$ is satisfied. In this case, similarly to Step S216 described above, the wavelength control information of CHNo. X+1 is wavelength control information including the wavelength $\lambda_{X+1}$ that is adjacent to the target wavelength $\lambda$ on the long wave side. The wavelength control information of CHNo. X is wavelength control information including the wavelength $\lambda_X$ that is adjacent to the target wavelength $\lambda$ on the short wave side. That is, the pieces of wavelength control information of CHNo. X+1 and CHNo. X correspond to the first wavelength control information and the second wavelength control information. The reference wavelength $\lambda_X$ and the control reference value $Pd_X$, and the reference wavelength $\lambda_{X+1}$ and the control reference value $Pd_{X+1}$ are represented by dots on the different curved lines CL1 and CL2. Thus, similarly to Step S216, at Step S221, the target value calculating part 312 calculates a control target value Pd2 (FIG. 7) corresponding to the target wavelength $\lambda$ by extrapolation from the control reference value $Pd_{X+1}$ and the wavelength $\lambda_{X+1}$ of the laser beam L1 that is output from the wavelength-tunable light source part 4 at the present time, and the control reference value $Pd_{X+2}$ and the wavelength $\lambda_{X+2}$ in the wavelength control information of CHNo. X+2 associated with the same mode identification information "B" as that of the wavelength control information of CHNo. X+1 including the wavelength $\lambda_{X+1}$. Similarly, the target value calculating part 312 calculates the initial electric power corresponding to the target wavelength $\lambda$ by extrapolation from the wavelength $\lambda_{X+1}$ and the reference electric power $PW_{X+1}$, and the wavelength $\lambda_{X+2}$ and the reference electric power $PW_{X+2}$. Step S221 is an example of a step of calculating the control target value based on the pieces of wavelength control information associated with the same mode identification information stored in the storage part 32.

After Step S221, the control device 3 returns to the main routine illustrated in FIG. 8.

Returning to Step S220, in a case of determining that the mode identification information associated with the reference wavelength $\lambda_Z$ and the mode identification information associated with the reference wavelength $\lambda_{Z-1}$ are the same (No at Step S220), the target value calculating part 312 performs the processing described below (Step S222).

At Step S222, the target value calculating part 312 refers to the pieces of wavelength control information stored in the storage part 32, and calculates various kinds of target values (the control target value and the initial electric power) from the wavelength control information including the reference wavelength $\lambda_{Z-1}$ and the wavelength control information including the reference wavelength $\lambda_Z$. Step S222 is an example of a step of calculating the control target value based on the pieces of wavelength control information associated with the same mode identification information stored in the storage part 32.

The case of determining "No" at Step S220 and performing Step S222 is assumed to be the following case, for example.

That is, assumed is a case in which the wavelength (reference wavelength $\lambda_Z$) of the laser beam L1 that is output from the wavelength-tunable light source part 4 at the present time is the reference wavelength $\lambda_{X+2}$, and $\lambda_{X+1} < \lambda < \lambda_{X+2}$ is satisfied. In this case, the reference wavelength $\lambda_{X+2}$ and the control reference value $Pd_{X+2}$, and the reference wavelength $\lambda_{X+1}$ and the control reference value $Pd_{X+1}$ are respectively associated with the same mode identification information, so that they are represented as dots on the same curved line CL2 (FIGS. 7 and 10). Thus, the target value calculating part 312 calculates the control target value corresponding to the target wavelength $\lambda$ by interpolation from the reference wavelength $\lambda_{X+2}$ and the control reference value $Pd_{X+2}$, and the reference wavelength $\lambda_{X+1}$ and the control reference value $Pd_{X+1}$. Similarly, the target value calculating part 312 calculates the initial electric power corresponding to the target wavelength $\lambda$ by interpolation from the reference wavelength $\lambda_{X+2}$ and the reference electric power $PW_{X+2}$, and the reference wavelength $\lambda_{X+1}$ and the reference electric power $PW_{X+1}$.

After Step S222, the control device 3 returns to the main routine illustrated in FIG. 8.

After Step S2, the wavelength control part 313 supplies the initial electric power calculated at Step S2 to each of the microheaters 421 to 423 (Step S3).

After Step S3, the monitor value calculating part 311 starts to calculate the PD ratio (Step S4: monitor value calculation step).

After Step S4, the wavelength control part 313 performs the wavelength lock processing for changing electric power to be supplied to each of the microheaters 421 to 423 so that the newest PD ratio calculated at Step S4 or the following steps agrees with the control target value calculated at Step S2 (Step S5: wavelength control step).

After Step S5, the wavelength control part 313 monitors whether the newest PD ratio calculated at Step S4 or the following steps agrees with the control target value calculated at Step S2 by performing Step S5 (Step S6).

In a case of determining that the PD ratio does not agree with the control target value (No at Step S6), the wavelength control part 313 returns the process to Step S5.

On the other hand, in a case of determining that the PD ratio agrees with the control target value (Yes at Step S6), the control device 3 ends this control procedure.

The first embodiment described above exhibits the following effect.

In the first embodiment, in a case in which the same wavelength as the target wavelength $\lambda$ is not included in the pieces of wavelength control information stored in the storage part 32, and the mode identification information is different between the first wavelength control information and the second wavelength control information, the target value calculating part 312 calculates the control target value (Pd1, Pd2) corresponding to the target wavelength $\lambda$ using the control reference values associated with the same mode identification information as that of the wavelength control information, which is one of the first wavelength control information and the second wavelength control information, including the wavelength $\lambda_Z$ of the laser beam L1 that is output from the wavelength-tunable light source part 4 at the present time (Step S216, S221).

That is, the control target values (Pd1, Pd2) are calculated from the dots on the same transmission characteristic (the curved line CL1 or the curved line CL2), so that appropriate control target values (Pd1, Pd2) can be calculated. Accordingly, by performing the wavelength lock processing using the appropriate control target values (Pd1, Pd2), the wavelength of the laser beam L1 can be controlled to be the target wavelength $\lambda$ with high accuracy.

Specifically, in the first embodiment, the target value calculating part 312 calculates the control target values (Pd1, Pd2) corresponding to the target wavelength $\lambda$ using the control reference values associated with the same mode identification information as that of the wavelength control information, which is one of the first wavelength control information and the second wavelength control information, including the wavelength $\lambda_Z$ of the laser beam L1 that is output from the wavelength-tunable light source part 4 at the present time.

Due to this, in a case of changing the emission wavelength of the laser beam L1 from the wavelength $\lambda_Z$ of the laser beam L1 that is output from the wavelength-tunable light source part 4 at the present time to the target wavelength $\lambda$, a change in the electric power supplied to each of the microheaters 421 to 423 can be suppressed, and a change in the transmission characteristic of the optical filter 63a can be suppressed. Accordingly, more appropriate control target values (Pd1, Pd2) can be calculated.

In the first embodiment, the only one temperature regulator 9 adjusts temperatures of the wavelength-tunable light source part 4 and the planar lightwave circuit 6. In this way, in a case of a structure of adjusting the temperatures of the members 4 and 6 by the only one temperature regulator 9, the wavelength-tunable part 42 is constituted of the microheaters 421 to 423 that locally heat the light source part 41, so that temperature distribution tends to be caused within the disposition surface 91, and the transmission characteristic of the optical filter 63a tends to be changed. In other words, a problem tends to be caused in such a structure.

Thus, by employing the first embodiment for this structure, an object of calculating an appropriate control target value can be preferably achieved.

Second Embodiment

Next, the following describes a second embodiment.

In the following description, the same configuration as that of the first embodiment described above is denoted by the same reference numeral, and detailed description thereof will be omitted or simplified.

In the second embodiment, the target value calculating part 312 performs a target value calculation step (Step S2A) described below instead of the target value calculation step (Step S2) described above in the first embodiment.

Figure 11:
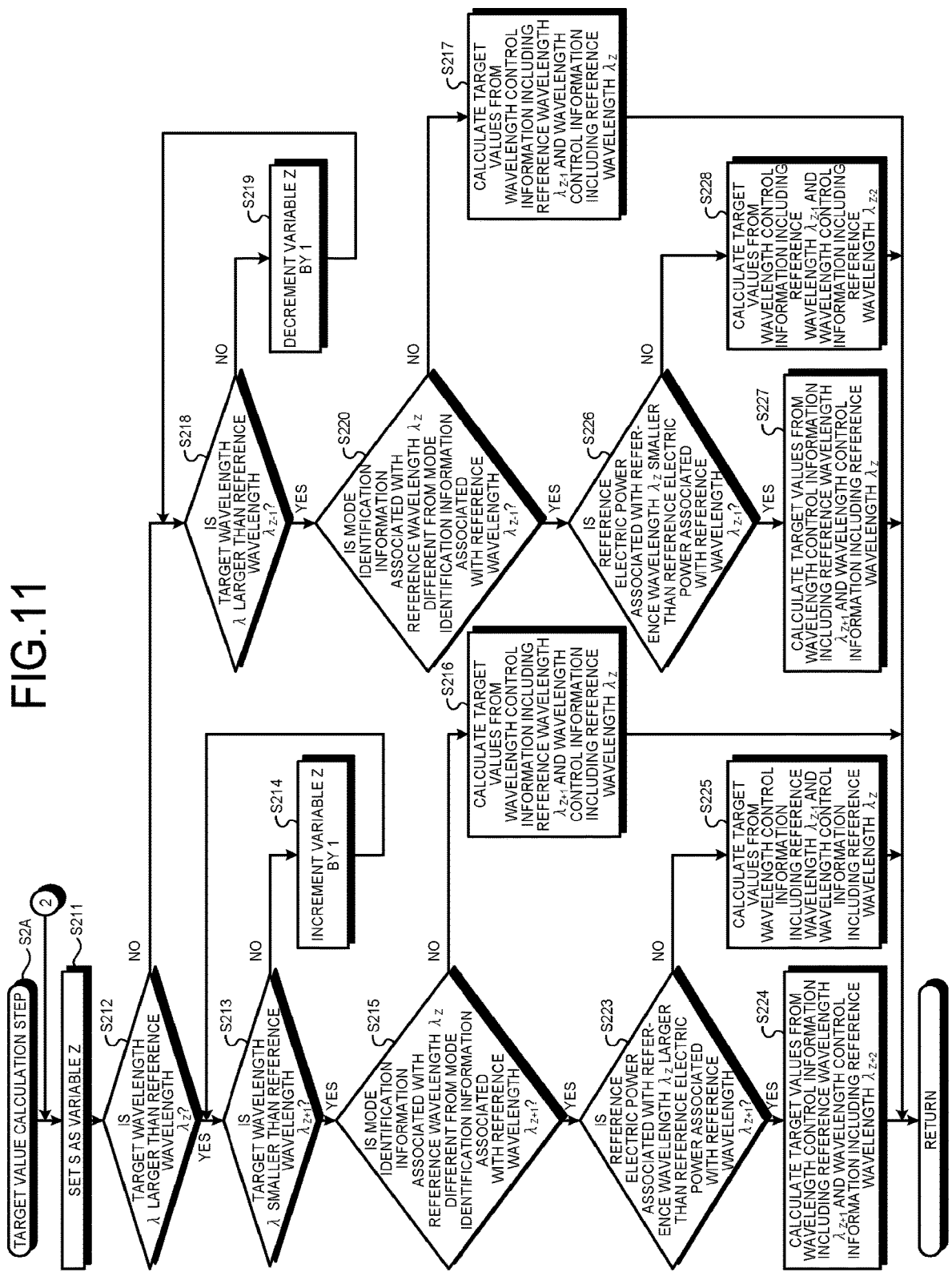
FIG. 11 is a flowchart illustrating a target value calculation step (Step S2A) according to a second embodiment.

FIG. 11 is a flowchart illustrating the target value calculation step (Step S2A) according to the second embodiment.

At the target value calculation step (Step S2A) according to the second embodiment, as illustrated in FIG. 11, for the target value calculation step (Step S2) described above in the first embodiment, Steps S223 to S225 are employed instead of Step S216, and Steps S226 to S228 are employed instead of Step S221. Thus, the following describes only Steps S223 to S228.

Step S223 is performed in a case in which it is determined that the mode identification information associated with the reference wavelength $\lambda_Z$ is different from the mode identification information associated with the reference wavelength $\lambda_{Z+1}$ (Yes at Step S215).

At Step S223, the target value calculating part 312 refers to the pieces of wavelength control information stored in the storage part 32, and determines whether reference electric power $PW_Z$ associated with the reference wavelength $\lambda_Z$ is larger than reference electric power $PW_{Z+1}$ associated with the reference wavelength $\lambda_{Z+1}$.

In a case of determining that the reference electric power $PW_Z$ is larger than the reference electric power $PW_{Z+1}$ (Yes at Step S223), the target value calculating part 312 performs the processing described below (Step S224).

At Step S224, the target value calculating part 312 refers to the pieces of wavelength control information stored in the storage part 32, and calculates various kinds of target values (the control target value and the initial electric power) from the wavelength control information including the reference wavelength $\lambda_{Z+1}$ and the wavelength control information including reference wavelength $\lambda_{Z+2}$.

On the other hand, in a case of determining that the reference electric power $PW_Z$ is smaller than the reference electric power $PW_{Z+1}$ (No at Step S223), the target value calculating part 312 performs the processing described below (Step S225).

At Step S225, the target value calculating part 312 refers to the pieces of wavelength control information stored in the storage part 32, and calculates various kinds of target values (the control target value and the initial electric power) from the wavelength control information including the reference wavelength $\lambda_{Z-1}$ and the wavelength control information including the reference wavelength $\lambda_Z$.

Herein, the case of determining "Yes" at Step S215 is a case in which a relation of $\lambda_Z < \lambda < \lambda_{Z+1}$ is satisfied, and the mode identification information associated with the reference wavelength $\lambda_Z$ is different from the mode identification information associated with the reference wavelength $\lambda_{Z+1}$. That is, the target wavelength $\lambda$ is a wavelength between the wavelengths $\lambda_{Z+1}$ and $\lambda_Z$ where the super mode is switched. Thus, when various kinds of target values (the control target value and the initial electric power) corresponding to the target wavelength $\lambda$ is calculated from the pieces of wavelength control information (corresponding to the first wavelength control information and the second wavelength control information) respectively including the reference wavelength $\lambda_{Z+1}$ and the reference wavelength $\lambda_Z$, an inappropriate value for the target value is calculated as described above in the first embodiment.

Additionally, the wavelength control information including the reference wavelength $\lambda_{Z+1}$ and the wavelength control information including reference wavelength $\lambda_{Z+2}$ include the same mode identification information. Similarly, the wavelength control information including the reference wavelength $\lambda_{Z-1}$ and the wavelength control information including the reference wavelength $\lambda_Z$ include the same mode identification information. That is, similarly to Steps S216 and S223 described above in the first embodiment, appropriate target values (the control target value and the initial electric power) can be calculated by calculating various kinds of target values (the control target value and the initial electric power) corresponding to the target wavelength $\lambda$ from the wavelength control information including the reference wavelength $\lambda_{Z+1}$ and the wavelength control information including reference wavelength $\lambda_{Z+2}$ (Step S224), or by calculating various kinds of target values (the control target value and the initial electric power) corresponding to the target wavelength $\lambda$ from the wavelength control information including the reference wavelength $\lambda_{Z-1}$ and the wavelength control information including the reference wavelength $\lambda_Z$ (Step S225).

In the second embodiment, the target value calculating part 312 performs Step S223 to select the wavelength control information with lower reference electric power from the first wavelength control information and the second wavelength control information (the pieces of wavelength control information respectively including the reference wavelength $\lambda_{Z+1}$ and the reference wavelength $\lambda_Z$). The target value calculating part 312 also calculates various kinds of target values (the control target value and the initial electric power) corresponding to the target wavelength $\lambda$ using the wavelength control information associated with the same mode identification information as that of the selected wavelength control information (Step S224, S225).

After Step S224 or Step S225, the control device 3 returns to the main routine illustrated in FIG. 8.

Step S226 is performed in a case in which it is determined that the mode identification information associated with the reference wavelength $\lambda_Z$ is different from the mode identification information associated with the reference wavelength $\lambda_{Z-1}$ (Yes at Step S220).

At Step S226, the target value calculating part 312 refers to the pieces of wavelength control information stored in the storage part 32, and determines whether the reference electric power $PW_Z$ associated with the reference wavelength $\lambda_Z$ is smaller than reference electric power $PW_{Z-1}$ associated with the reference wavelength $\lambda_{Z-1}$.

In a case of determining that the reference electric power $PW_Z$ is smaller than the reference electric power $PW_{Z-1}$ (Yes at Step S226), the target value calculating part 312 performs the processing described below (Step S227).

At Step S227, the target value calculating part 312 refers to the pieces of wavelength control information stored in the storage part 32, and calculates various kinds of target values (the control target value and the initial electric power) from the wavelength control information including the reference wavelength $\lambda_{Z+1}$ and the wavelength control information including the reference wavelength $\lambda_Z$.

On the other hand, in a case of determining that the reference electric power $PW_Z$ is larger than the reference electric power $PW_{Z-1}$ (No at Step S226), the target value calculating part 312 performs the processing described below (Step S228).

At Step S228, the target value calculating part 312 refers to the pieces of wavelength control information stored in the storage part 32, and calculates various kinds of target values (the control target value and the initial electric power) from the wavelength control information including the reference wavelength $\lambda_{Z-1}$ and the wavelength control information including a reference wavelength $\lambda_{Z-2}$.

Herein, the case of determining "Yes" at Step S220 is a case in which a relation of $\lambda_{Z-1} < \lambda < \lambda_Z$ is satisfied, and the mode identification information associated with the reference wavelength $\lambda_Z$ is different from the mode identification information associated with the reference wavelength $\lambda_{Z-1}$. That is, the target wavelength $\lambda$ is a wavelength between the wavelengths $\lambda_Z$ and $\lambda_{Z-1}$ where the super mode is switched. Thus, when various kinds of target values (the control target value and the initial electric power) corresponding to the target wavelength $\lambda$ are calculated from the pieces of wavelength control information (corresponding to the first wavelength control information and the second wavelength control information) respectively including the reference wavelength $\lambda_Z$ and the reference wavelength $\lambda_{Z-1}$, as described above in the first embodiment, inappropriate values for the target value are calculated.

The wavelength control information including the reference wavelength $\lambda_{Z+1}$ and the wavelength control information including the reference wavelength $\lambda_Z$ include the same mode identification information. Similarly, the wavelength control information including the reference wavelength $\lambda_{Z-1}$ and the wavelength control information including the reference wavelength $\lambda_{Z-2}$ include the same mode identification information. That is, similarly to Steps S216 and S221 described above in the first embodiment, appropriate target values (the control target value and the initial electric power)

can be calculated by calculating various kinds of target values (the control target value and the initial electric power) corresponding to the target wavelength λ from the wavelength control information including the reference wavelength $\lambda_{Z+1}$ and the wavelength control information including the reference wavelength $\lambda_Z$ (Step S227), or calculating various kinds of target values (the control target value and the initial electric power) corresponding to the target wavelength λ from the wavelength control information including the reference wavelength $\lambda_{Z-1}$ and the wavelength control information including the reference wavelength $\lambda_{Z-2}$ (Step S228).

In the second embodiment, the target value calculating part 312 performs Step S226 to select the wavelength control information with lower reference electric power from the first wavelength control information and the second wavelength control information (the pieces of wavelength control information respectively including the reference wavelength $\lambda_Z$ and the reference wavelength $\lambda_{Z-1}$). The target value calculating part 312 also calculates various kinds of target values (the control target value and the initial electric power) corresponding to the target wavelength λ using the wavelength control information associated with the same mode identification information as that of the selected wavelength control information (Steps S227 and S228).

After Step S227 or Step S228, the control device 3 returns to the main routine illustrated in FIG. 8.

The second embodiment described above exhibits the following effect in addition to the same effect as that of the first embodiment described above.

In the second embodiment, the target value calculating part 312 selects the wavelength control information with lower reference electric power from the first wavelength control information and the second wavelength control information, and calculates the control target values corresponding to the target wavelength λ using the wavelength control information associated with the same mode identification information as that of the selected wavelength control information (Steps S223 to S225, and S226 to S228).

Due to this, appropriate control target values can be calculated, and low power consumption of the wavelength-tunable laser device 1 can be achieved.

Third Embodiment

Next, the following describes a third embodiment.

In the following description, the same configuration as that of the first embodiment described above is denoted by the same reference numeral, and detailed description thereof will be omitted or simplified.

In the third embodiment, the target value calculating part 312 performs the following target value calculation step (Step S2B) instead of the target value calculation step (Step S2) described above in the first embodiment.

FIG. 12 is a flowchart illustrating the target value calculation step (Step S2B) according to the third embodiment.

At the target value calculation step (Step S2B) according to the third embodiment, first, the target value calculating part 312 refers to the pieces of wavelength control information stored in the storage part 32, and determines whether the reference electric power $PW_Z$ associated with the wavelength (reference wavelength $\lambda_Z$) of the laser beam L1 that is output from the wavelength-tunable light source part 4 at the present time is equal to or larger than a specific threshold (Step S231).

In a case of determining that the reference electric power $PW_Z$ is smaller than the specific threshold (No at Step S231), the target value calculating part 312 performs the processing at Step S2 (corresponding to first calculation processing) illustrated in FIG. 9.

On the other hand, in a case of determining that the reference electric power $PW_Z$ is equal to or larger than the specific threshold (Yes at S231), the target value calculating part 312 performs the processing at Step S2A (corresponding to second calculation processing) illustrated in FIG. 11.

The third embodiment described above exhibits the following effect in addition to the same effect as that of the first and the second embodiments described above.

In the third embodiment, the target value calculating part 312 performs the first calculation processing in a case in which the reference electric power $PW_Z$ associated with the wavelength (reference wavelength $\Delta_Z$) of the laser beam L1 that is output from the wavelength-tunable light source part 4 at the present time is smaller than the specific threshold, and performs the second calculation processing in a case in which the reference electric power $PW_Z$ is equal to or larger than the specific threshold.

Due to this, the second calculation processing can be performed only in a case in which power consumption is relatively high at the present time, and electric power supplied to each of the microheaters 421 to 423 can be prevented from being unnecessarily and largely changed.

Fourth Embodiment

Next, the following describes a fourth embodiment.

In the following description, the same configuration as that of the first embodiment described above is denoted by the same reference numeral, and detailed description thereof will be omitted or simplified.

In the fourth embodiment, the storage part 32 stores the wavelength control information illustrated in FIG. 13 as an example instead of the wavelength control information illustrated in FIG. 7.

In FIG. 13, each of m and n used for subscripts of CHNo. and the like is an integral number equal to or larger than 4, for example.

Similarly to the case of FIG. 7, a plurality of pieces of wavelength control information illustrated in FIG. 13 is information in which the reference wavelength, a plurality of pieces of the electric power that are supplied to the respective microheaters 421 to 423 for controlling the wavelength of the laser beam L1 to be the reference wavelength, the control reference value to be the reference value of the PD ratio in a case setting the wavelength of the laser beam L1 to be the reference wavelength, and the mode identification information for identifying the super mode that is determined in a case in which the wavelength lock processing is performed by using the pieces of electric power and the control reference value are associated with each other.

However, in FIG. 13, the pieces of wavelength control information include a plurality of pieces of third wavelength control information and a plurality of pieces of fourth wavelength control information.

Examples of the pieces of third wavelength control information are the pieces of wavelength control information from CHNo. 1 to CHNo. X+n−1. The pieces of third wavelength control information are associated with the mode identification information "A" in a wavelength range from the reference wavelengths $\lambda_1$ to $\lambda_{X+n-1}$ (an example of a first wavelength range).

Examples of the pieces of fourth wavelength control information are the pieces of wavelength control information from CHNo. X−m+1 to predetermined CHNo. that is at least larger than CHNo. X+n+1 (not illustrated). The pieces of fourth wavelength control information are associated with the mode identification information "B" in a wavelength range from the reference wavelength $\lambda_{X-m+1}$ to a predetermined wavelength that is at least longer than $\lambda_{X+n+1}$ (an example of a second wavelength range).

The first wavelength range and the second wavelength range in these examples partially overlap each other. An overlapping wavelength range is from $\lambda_{X-m+1}$ to $\Delta_{X+n-1}$.

Each piece of the wavelength control information at each wavelength includes the respective reference electric power as total electric power of the pieces of electric power supplied to the respective microheaters 421 to 423 per mode, and includes the control reference value to be the reference value of the PD ratio in a case of setting the target wavelength of the laser beam L1 to be each reference wavelength. For example, in the wavelength control information of CHNo. X, the mode identification information "A" is associated with $PDA_X$ and $PWA_X$ [W], and the mode identification information "B" is associated with $PDB_X$ and $PWB_X$ [W].

Although not illustrated, the storage part 32 also stores the pieces of wavelength control information associated with the mode identification information "C", . . . different from the pieces of mode identification information "A" and "B". For example, the mode identification information "C" is associated with each wavelength (for example, the grid wavelength) in the wavelength range partially overlapping the second wavelength range to configure the wavelength control information.

In FIG. 7, the pieces of wavelength control information of adjacent CHNos. are assumed to have the same mode identification information when a difference between the pieces of reference electric power associated with the pieces of wavelength control information is smaller than a predetermined threshold, and the pieces of wavelength control information are assumed to have different pieces of the mode identification information when the difference is equal to or larger than the threshold.

On the other hand, in a case of FIG. 13, the pieces of wavelength control information of CHNo. X and CHNo. X+1 are associated with the same mode identification information "A" even when the difference between the pieces of reference electric power associated with the pieces of wavelength control information is equal to or larger than the predetermined threshold. Similarly, the pieces of wavelength control information of CHNo. X and CHNo. X+1 are associated with the same mode identification information "B" even when the difference between the pieces of reference electric power associated with the pieces of wavelength control information is equal to or larger than the predetermined threshold, for example.

Accordingly, in FIG. 13, it can be said that the wavelength range of the reference wavelength associated with the mode identification information "A" is expanded corresponding to an expansion range from a range from the reference wavelength $\lambda_1$ to $\lambda_X$ to a range from the reference wavelength $\lambda_1$ to $\lambda_{X+(n-1)}$ as compared with the case of FIG. 7. Similarly, it can be said that the wavelength range of the reference wavelength associated with the mode identification information "B" is expanded corresponding to the expansion range from a range from the reference wavelength $\lambda_X$ to a range from the reference wavelength $\lambda_{X-m+1}$ as compared with the case of FIG. 7.

The expansion range can be expanded up to a range in which the electric power supplied to the microheater 421 or the microheater 422 becomes zero.

In the fourth embodiment, the control part 31 performs the control method similarly to the case illustrated in FIGS. 8 and 9.

At Step S215 in FIG. 9, in determining whether the mode identification information associated with the reference wavelength $\lambda_Z$ is different from the mode identification information associated with the reference wavelength $\lambda_{Z+1}$, even if there are a plurality of pieces of the mode identification information associated with the reference wavelength $\lambda_Z$ or the reference wavelength $\lambda_{Z+1}$, "No" is determined at Step S215 so long as there is the same mode identification information associated with both of the reference wavelength $\lambda_Z$ and the reference wavelength $\lambda_{Z+1}$.

The fourth embodiment described above exhibits the following effect in addition to the same effect as that of the first embodiment described above.

For example, considered is a case in which the control device 3 changes, in the wavelength range from the reference wavelength $\lambda_1$ to $\lambda_{X+(n-1)}$ as an example of the first wavelength range associated with the mode identification information "A", the wavelength of the laser beam L1 output from the wavelength-tunable light source part 4 to the target wavelength that is included in the wavelength range from $\lambda_{X-m+1}$ to $\Delta_{X+n-1}$, and corresponding wavelength control information thereof is not present in the storage part 32. The wavelength range from $\lambda_{X-m+1}$ to $\lambda_{X+n-1}$ is an example of a range in which the first and the second wavelength ranges overlap each other.

In this case, the target value calculating part 312 calculates the control target value corresponding to the target wavelength using control reference values of the pieces of third wavelength control information associated with the mode identification information "A".

Due to this, a change from the wavelength of the laser beam L1 output from the wavelength-tunable light source part 4 to the target wavelength can be implemented by only the super mode corresponding to the mode identification information "A", so that control for switching the super mode can be omitted.

For example, in a case of using the wavelength control information as illustrated in FIG. 7, and changing the wavelength of the laser beam L1 from the wavelength $\lambda_1$ to the wavelength $\lambda_{X+2}$ as the target wavelength, the super mode is required to be switched.

On the other hand, in a case of using the wavelength control information as illustrated in FIG. 13, and changing the wavelength of the laser beam L1 from the wavelength $\lambda_1$ to the wavelength $\lambda_{X+2}$ as the target wavelength, the super mode is not required to be switched.

The fourth embodiment using the wavelength control information as illustrated in FIG. 13 can be preferably used in a case of performing control, what is called fine-tuning frequency (FTF), for example. The FTF is control for continuously changing the wavelength of the laser beam L1 up to the target wavelength while maintaining a state in which the wavelength-tunable light source part 4 outputs the laser beam L1, and the laser device 1 outputs the laser beam L2.

All of the reference wavelengths in a range in which the wavelength ranges overlap each other are not necessarily associated with different pieces of the mode identification information to be stored in the storage part 32. For example, in the wavelength range from $\lambda_{X-m+1}$ to $\Delta_{X+n-1}$, regarding one or a plurality of the reference wavelengths $\lambda_k$ (X−m+

1<k<X+n−1), the storage part 32 may store the wavelength control information associated with the mode identification information "A", $PDA_k$, and $PWA_k$ [W] without storing the wavelength control information associated with the mode identification information "B". In such a case, in a case of newly calculating the wavelength control information of the reference wavelength $\lambda_k$ associated with the mode identification information "B", the wavelength control information may be calculated based on the wavelength control information of the other reference wavelengths associated with the mode identification information "B" stored in the storage part 32.

Other Embodiments

The aspects for carrying out the present disclosure have been described above, but the present disclosure is not limited to the first to the fourth embodiments described above.

In the first to the fourth embodiments described above, the two optical filters 63a and 64a are disposed, but the embodiment is not limited thereto. Only one optical filter 63a may be disposed, or three or more optical filters may be disposed.

In the first to the fourth embodiments described above, the ring resonator-type optical filters 63a and 64a are employed as optical filters according to the present disclosure, but the embodiment is not limited thereto. Other optical filters such as an etalon may be employed as the optical filter according to the present disclosure so long as the optical filter has a periodic transmission characteristic for a wavelength of incident light.

A procedure indicating the wavelength control method performed by the control device 3 is not limited to the order of processes in the flowchart (FIG. 8, FIG. 9, FIG. 11, and FIG. 12) described above in the first to the fourth embodiments, and may be modified without contradiction.

In the first to the fourth embodiments, Z=S is set corresponding to the reference wavelength $\lambda_S$ as the wavelength of the laser beam L1 that is output from the wavelength-tunable light source part 4 at Step S211, but the embodiment is not limited thereto. At Step S211, the procedures of the first to the fourth embodiments may be performed by setting $Z_0$ different from S. For example, as $Z_0$, the smallest CHNo., the largest CHNo., or CHNo. corresponding to any predetermined piece of the wavelength control information may be used among CHNos. stored in the storage part 32. On the other hand, in a case of setting Z=S, and a difference between the target wavelength $\lambda$ and the wavelength of the laser beam L1 that is output from the wavelength-tunable light source part 4 at the present time is small (for example, in a case in which $\lambda_S<\lambda<\lambda_{S+1}$ or $\lambda_{S-1}<\lambda<\lambda_S$ is satisfied), setting Z=S at Step S211 is preferable since a time required for calculating the target value can be shortened.

With the wavelength-tunable laser device and the wavelength control method according to the present disclosure, an appropriate control target value can be calculated, and a wavelength of a laser beam can be controlled to be a target wavelength with high accuracy.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wavelength-tunable laser device comprising:
a wavelength-tunable light source part configured to tune an emission wavelength of a laser beam using a Vernier effect,
an optical filter having a periodic transmission characteristic for a wavelength of the laser beam output from the wavelength-tunable light source part;
a light receiving element configured to acquire intensity of the laser beam transmitted through the optical filter;
a control device configured to control an operation of the wavelength-tunable light source part; and
a single temperature regulator including a disposition surface on which the wavelength-tunable light source part and the optical filter are disposed, wherein the wavelength-tunable light source part and the optical filter are disposed on the same disposition surface of the single temperature regulator, the single temperature regulator being configured to control a driving condition of the wavelength-tunable light source part to cause a situation in which temperature distribution within the disposition surface changes, thereby causing a temperature of the optical filter to become a first temperature or a second temperature different from the first temperature to change the transmission characteristic of the optical filter, wherein
the control device comprises:
a monitor value calculating part configured to calculate a monitor value corresponding to the wavelength of the laser beam based on the intensity of the laser beam acquired by the light receiving element;
a storage part configured to store a plurality of pieces of wavelength control information;
a target value calculating part configured to calculate a control target value corresponding to a target wavelength of the laser beam as a target value of the monitor value based on the wavelength control information and the target wavelength; and
a wavelength control part configured to control the wavelength of the laser beam to be the target wavelength based on the control target value and the monitor value, wherein
the wavelength control information is information in which a wavelength, a control reference value corresponding to the wavelength as a reference value of the monitor value, and mode identification information for identifying a super mode that is determined in a case in which the control reference value is caused to be the control target value are associated with each other, the super mode being a wavelength of a laser beam that an optical resonator in a wavelength-tunable light source part outputs when reflection peaks agree in wavelength, and
the target value calculating part calculates the control target based on a plurality of pieces of the wavelength control information stored in the storage part in association with the same mode identification information in a case in which the same wavelength as the target wavelength when the control target is not included in the wavelength control information that is stored in the storage unit,
wherein the target value calculating part calculates, in a case in which the mode identification information is different between first wavelength control information including the wavelength that is adjacent to the target wavelength on either one of a short wave side or a long wave side and second wavelength control information including the wavelength that is adjacent to the target wavelength on another one of the short wave side or the long wave side among the pieces of wavelength control information, the control target value by using a plurality of the control reference values associated with the same mode identification information as the mode identification information of one of the first wavelength control information and the second wavelength control information, wherein the target value calculating part calculates, in a case in which the mode identification information is the same as first wavelength control information including the wavelength that is adjacent to the target wavelength on either one of a short wave side or a long wave side and second wavelength control information including the wavelength that is adjacent to the target wavelength on another one of the short wave side or the long wave side among the pieces of wavelength control information, the control target value by using a plurality of the control reference values associated with the same mode identification information, and wherein the temperature of the optical filter is the first temperature when the mode identification information is the same, and the temperature of the optical filter is the second temperature when the mode identification information is different.

2. The wavelength-tunable laser device according to claim 1, wherein the target value calculating part calculates, in a case of changing the wavelength of the laser beam output from the wavelength-tunable light source part to the target wavelength, the control target value corresponding to the target wavelength by using the control reference values associated with the same mode identification information as the mode identification information of the wavelength control information that is used for calculating the control target value corresponding to the wavelength of the laser beam that is output from the wavelength-tunable light source part.

3. The wavelength-tunable laser device according to claim 1, wherein the pieces of wavelength control information include
a plurality of pieces of third wavelength control information in which the wavelength in a first wavelength range is associated with first mode identification information, and
a plurality of pieces of fourth wavelength control information in which second mode identification information different from the first mode identification information is associated with the wavelength in a second wavelength range that partially overlaps the first wavelength range and is different from the first wavelength range.

4. The wavelength-tunable laser device according to claim 3, wherein, in a case of changing the wavelength of the laser beam output from the wavelength-tunable light source part in the first wavelength range to the target wavelength in a range in which the first wavelength range and the second wavelength range overlap each other, the target value calculating part calculates the control target value corresponding to the target wavelength based on the control reference values of the pieces of third wavelength control information.

5. The wavelength-tunable laser device according to claim 1, wherein the wavelength control information is information in which the wavelength, the control reference value, the mode identification information, and electric power supplied to the wavelength-tunable light source part are associated with each other, and the target value calculating part calculates the control target value corresponding to the target wavelength by using the control reference values associated with the same mode identification information as the mode identification information of the wavelength control information with lower electric power of the first wavelength control information and the second wavelength control information.

6. The wavelength-tunable laser device according to claim 1, wherein the wavelength control information is information in which the wavelength, the control reference value, the mode identification information, and electric power supplied to the wavelength-tunable light source part are associated with each other, the target value calculating part performs, in a case of changing the wavelength of the laser beam output from the wavelength-tunable light source part to the target wavelength, first calculation processing or second calculation processing based on the electric power associated with the wavelength of the laser beam output from the wavelength-tunable light source part, the first calculation processing is processing of calculating, in a case in which the electric power associated with the wavelength of the laser beam output from the wavelength-tunable light source part is smaller than a specific threshold, the control target value corresponding to the target wavelength by using the control reference values associated with the same mode identification information as the mode identification information of the wavelength control information that is used for calculating the control target value corresponding to the wavelength of the laser beam output from the wavelength-tunable light source part, and the second calculation processing is processing of calculating, in a case in which the electric power associated with the wavelength of the laser beam output from the wavelength-tunable light source part is equal to or larger than the specific threshold, the control target value corresponding to the target wavelength by using the control reference values associated with the same mode identification information as the mode identification information of the wavelength control information with lower electric power of the first wavelength control information and the second wavelength control information.

7. A wavelength control method performed by a control device of a wavelength-tunable laser device, wherein the wavelength-tunable laser device includes:
a wavelength-tunable light source part configured to tune an emission wavelength of a laser beam using a Vernier effect;
an optical filter having a periodic transmission characteristic for a wavelength of the laser beam output from the wavelength-tunable light source part;
a light receiving element configured to acquire intensity of the laser beam transmitted through the optical filter;
a single temperature regulator including a disposition surface on which the wavelength-tunable light source part and the optical filter are disposed, wherein the wavelength-tunable light source part and the optical filter are disposed on the same disposition surface of the single temperature regulator, the single temperature regulator being configured to control a driving condition of the wavelength-tunable light source part to cause a situation in which temperature distribution within the disposition surface changes, thereby causing a temperature of the optical filter to become a first temperature or a second temperature different from the first temperature to change the transmission characteristic of the optical filter; and the control device configured to control an operation of the wavelength-tunable light source part, and the control device includes a storage part configured to store a plurality of pieces of wavelength control information, the wavelength control method comprising:

calculating a monitor value corresponding to the wavelength of the laser beam based on the intensity of the laser beam acquired by the light receiving element;

calculating a control target value corresponding to a target wavelength of the laser beam as a target value of the monitor value based on the wavelength control information and the target wavelength; and controlling the wavelength of the laser beam to be the target wavelength based on the control target value and the monitor value, wherein the wavelength control information is information in which a wavelength, a control reference value corresponding to the wavelength as a reference value of the monitor value, and mode identification information for identifying a super mode that is determined in a case in which the control reference value is caused to be the control target value are associated with each other, the super mode being a wavelength of a laser beam that an optical resonator in a wavelength-tunable light source part outputs when reflection peaks agree in wavelength, at the calculating the control target value when the control target is not included in the wavelength control information that is stored in the storage unit, the control target is calculated based on the pieces of wavelength control information stored in the storage part in association with the same mode identification information when in a case in which the same wavelength as the target wavelength, in a case in which the mode identification information is different between first wavelength control information including the wavelength that is adjacent to the target wavelength on either one of a short wave side or a long wave side and second wavelength control information including the wavelength that is adjacent to the target wavelength on another one of the short wave side or the long wave side among the pieces of wavelength control information, the control target value is calculated by using a plurality of the control reference values associated with the same mode identification information as the mode identification information of one of the first wavelength control information and the second wavelength control information, in a case in which the mode identification information is the same as first wavelength control information including the wavelength that is adjacent to the target wavelength on either one of a short wave side or a long wave side and second wavelength control information including the wavelength that is adjacent to the target wavelength on another one of the short wave side or the long wave side among the pieces of wavelength control information, the control target value is calculated by using a plurality of the control reference values associated with the same mode identification information, and wherein the temperature of the optical filter is the first temperature when the mode identification information is the same, and the temperature of the optical filter is the second temperature when the mode identification information is different.

* * * * *